(12) United States Patent
Toye

(10) Patent No.: US 6,339,898 B1
(45) Date of Patent: Jan. 22, 2002

(54) PLANT TREATMENT MATERIAL AND METHOD

(76) Inventor: Jonathan Dallas Toye, Old Railway Road, Kumeu, Auckland (NZ)

( * ) Notice: Subject to any disclaimer, the term of this patent is extended or adjusted under 35 U.S.C. 154(b) by 0 days.

(21) Appl. No.: 09/308,438

(22) PCT Filed: Nov. 19, 1997

(86) PCT No.: PCT/NZ97/00157

§ 371 Date: Aug. 20, 1999

§ 102(e) Date: Aug. 20, 1999

(87) PCT Pub. No.: WO98/21935

PCT Pub. Date: May 28, 1998

(30) Foreign Application Priority Data

Nov. 19, 1996 (NZ) ................................. 299783
Sep. 18, 1997 (NZ) ................................. 328780

(51) Int. Cl.[7] ................................................ A01G 7/00

(52) U.S. Cl. ............................................................. 47/9

(58) Field of Search ...................... 47/9, 28.1; 424/416; 428/141, 220, 329; 524/423

(56) References Cited

U.S. PATENT DOCUMENTS

| | | | | | |
|---|---|---|---|---|---|
| 2,740,233 | A | * | 4/1956 | Reynolds | 47/9 |
| 2,940,219 | A | * | 6/1960 | Schiller | 47/32 |
| 3,043,709 | A | * | 7/1962 | Amborski | 428/216 |
| 3,276,943 | A | * | 10/1966 | Kawamura | 428/213 |
| 3,718,533 | A | * | 2/1973 | Shibata | 428/215 |
| 4,075,784 | A | * | 2/1978 | Pied | 47/9 |
| 4,134,875 | A | * | 1/1979 | Tapia | 524/423 |
| 4,423,164 | A | * | 12/1983 | Bar | 523/135 |
| 4,761,913 | A | * | 8/1988 | Henningsson et al. | 47/17 |
| 4,794,726 | A | * | 1/1989 | Fawcett et al. | 47/9 |
| 5,288,545 | A | * | 2/1994 | De Decker | 442/185 |
| 5,729,929 | A | * | 3/1998 | Burke | 47/9 |
| 6,080,688 | A | * | 6/2000 | Henningsson et al. | 442/185 |

* cited by examiner

Primary Examiner—Charles T. Jordan
Assistant Examiner—Francis T. Palo
(74) Attorney, Agent, or Firm—Hovey, Williams, Timmons & Collins

(57) ABSTRACT

The invention relates to a reflective plant treatment material comprising at least one pigment and having high reflectance of UV (280–400 nm), visible (400–700 um) and near infrared (700–800 nm) radiation, but allowing at least part transmission of radiation of 800–2500 nm, and to use of the material and method of treating plants.

86 Claims, 21 Drawing Sheets

FIG 11

Reflectance - measured as for System One

Sample

| Wavelength nm | JJ | JS | SS | WW | JTS | MET | SC | TX |
|---|---|---|---|---|---|---|---|---|
| 280 | 5.60E-01 | 4.50E-01 | 1.26E-01 | 1.02E-01 | 1.69E-01 | 7.85E-01 | 2.51E-01 | 6.67E-01 |
| 300 | 6.58E-01 | 5.93E-01 | 1.09E-01 | 9.08E-02 | 1.46E-01 | 7.86E-01 | 3.67E-01 | 8.22E-01 |
| 320 | 6.92E-01 | 6.18E-01 | 7.22E-01 | 8.79E-02 | 1.38E-01 | 7.97E-01 | 3.92E-01 | 8.15E-01 |
| 340 | 7.61E-01 | 6.64E-01 | 8.30E-01 | 8.39E-02 | 1.31E-01 | 8.04E-01 | 4.11E-01 | 8.43E-01 |
| 360 | 7.83E-01 | 6.75E-01 | 8.38E-01 | 9.94E-02 | 1.41E-01 | 8.09E-01 | 4.19E-01 | 8.60E-01 |
| 380 | 7.94E-01 | 6.77E-01 | 8.41E-01 | 1.57E-01 | 1.87E-01 | 8.13E-01 | 4.19E-01 | 8.61E-01 |
| 400 | 7.99E-01 | 6.77E-01 | 3.41E-01 | 4.80E-01 | 4.48E-01 | 8.18E-01 | 4.15E-01 | 8.61E-01 |
| 420 | 8.00E-01 | 6.76E-01 | 8.42E-01 | 7.09E-01 | 6.51E-01 | 8.22E-01 | 4.13E-01 | 8.61E-01 |
| 440 | 8.00E-01 | 6.74E-01 | 8.41E-01 | 7.14E-01 | 6.53E-01 | 8.24E-01 | 4.13E-01 | 8.60E-01 |
| 460 | 8.00E-01 | 6.71E-01 | 8.39E-01 | 7.15E-01 | 6.49E-01 | 8.27E-01 | 4.11E-01 | 8.59E-01 |
| 480 | 8.00E-01 | 6.68E-01 | 8.39E-01 | 7.13E-01 | 6.44E-01 | 8.29E-01 | 4.10E-01 | 8.57E-01 |
| 500 | 7.98E-01 | 6.65E-01 | 8.38E-01 | 7.11E-01 | 6.38E-01 | 8.30E-01 | 4.09E-01 | 8.56E-01 |
| 520 | 7.98E-01 | 6.62E-01 | 8.35E-01 | 7.09E-01 | 6.31E-01 | 8.32E-01 | 4.06E-01 | 8.55E-01 |
| 540 | 7.96E-01 | 6.59E-01 | 8.33E-01 | 7.06E-01 | 6.25E-01 | 8.32E-01 | 4.13E-01 | 8.54E-01 |
| 560 | 7.93E-01 | 6.56E-01 | 8.30E-01 | 7.03E-01 | 6.17E-01 | 8.32E-01 | 4.04E-01 | 8.53E-01 |
| 580 | 7.91E-01 | 6.53E-01 | 8.27E-01 | 7.00E-01 | 6.10E-01 | 8.33E-01 | 4.02E-01 | 8.52E-01 |
| 600 | 7.90E-01 | 6.51E-01 | 8.23E-01 | 6.97E-01 | 6.02E-01 | 8.32E-01 | 4.00E-01 | 8.51E-01 |
| 620 | 7.89E-01 | 6.48E-01 | 8.17E-01 | 6.94E-01 | 5.96E-01 | 8.31E-01 | 3.98E-01 | 8.50E-01 |
| 640 | 7.88E-01 | 6.46E-01 | 8.15E-01 | 6.91E-01 | 5.88E-01 | 8.30E-01 | 3.94E-01 | 8.49E-01 |
| 660 | 7.86E-01 | 6.43E-01 | 8.08E-01 | 6.87E-01 | 5.81E-01 | 8.28E-01 | 3.93E-01 | 8.48E-01 |
| 680 | 7.84E-01 | 6.40E-01 | 8.01E-01 | 6.84E-01 | 5.73E-01 | 8.25E-01 | 3.90E-01 | 8.47E-01 |
| 700 | 7.83E-01 | 6.38E-01 | 8.07E-01 | 6.81E-01 | 5.66E-01 | 8.22E-01 | 3.88E-01 | 8.46E-01 |
| 720 | 7.82E-01 | 6.36E-01 | 7.94E-01 | 6.78E-01 | 5.59E-01 | 8.18E-01 | 3.85E-01 | 8.46E-01 |
| 740 | 7.81E-01 | 6.32E-01 | 7.84E-01 | 6.74E-01 | 5.53E-01 | 8.13E-01 | 3.82E-01 | 8.44E-01 |
| 760 | 7.79E-01 | 6.29E-01 | 7.75E-01 | 6.69E-01 | 5.45E-01 | 8.07E-01 | 3.78E-01 | 8.44E-01 |
| 780 | 7.78E-01 | 6.26E-01 | 7.85E-01 | 6.67E-01 | 5.38E-01 | 8.00E-01 | 3.73E-01 | 8.43E-01 |
| 800 | 7.77E-01 | 6.23E-01 | 7.52E-01 | 6.63E-01 | 5.30E-01 | 7.94E-01 | 3.68E-01 | 8.42E-01 |
| 820 | 7.75E-01 | 6.20E-01 | 7.39E-01 | 6.60E-01 | 5.23E-01 | 7.89E-01 | 3.63E-01 | 8.41E-01 |
| 840 | 7.73E-01 | 6.19E-01 | 7.56E-01 | 6.56E-01 | 5.18E-01 | 7.90E-01 | 3.63E-01 | 8.40E-01 |
| 860 | 7.71E-01 | 6.17E-01 | 7.78E-01 | 6.52E-01 | 5.15E-01 | 7.96E-01 | 3.67E-01 | 8.39E-01 |
| 880 | 7.70E-01 | 6.16E-01 | 7.98E-01 | 6.49E-01 | 5.13E-01 | 8.08E-01 | 3.76E-01 | 8.38E-01 |
| 900 | 7.67E-01 | 6.16E-01 | 8.16E-01 | 6.43E-01 | 5.12E-01 | 8.21E-01 | 3.84E-01 | 8.37E-01 |
| 920 | 7.64E-01 | 6.15E-01 | 8.30E-01 | 6.39E-01 | 5.09E-01 | 8.35E-01 | 3.92E-01 | 8.34E-01 |
| 940 | 7.63E-01 | 6.16E-01 | 8.38E-01 | 6.37E-01 | 5.07E-01 | 8.47E-01 | 4.00E-01 | 8.32E-01 |
| 960 | 7.63E-01 | 6.16E-01 | 8.41E-01 | 6.35E-01 | 5.07E-01 | 8.58E-01 | 4.07E-01 | 8.33E-01 |
| 980 | 7.62E-01 | 6.16E-01 | 8.47E-01 | 6.32E-01 | 5.05E-01 | 8.67E-01 | 4.12E-01 | 8.33E-01 |
| 1000 | 7.59E-01 | 6.15E-01 | 8.63E-01 | 6.27E-01 | 5.02E-01 | 8.75E-01 | 4.15E-01 | 8.32E-01 |
| 1020 | 7.57E-01 | 6.11E-01 | 8.80E-01 | 6.21E-01 | 4.96E-01 | 8.81E-01 | 4.21E-01 | 8.27E-01 |
| 1040 | 7.55E-01 | 6.10E-01 | 8.88E-01 | 6.19E-01 | 4.97E-01 | 8.86E-01 | 4.25E-01 | 8.25E-01 |
| 1060 | 7.54E-01 | 6.10E-01 | 8.79E-01 | 6.16E-01 | 4.97E-01 | 8.91E-01 | 4.28E-01 | 8.25E-01 |
| 1080 | 7.53E-01 | 6.10E-01 | 8.91E-01 | 6.14E-01 | 4.94E-01 | 8.96E-01 | 4.29E-01 | 8.25E-01 |
| 1100 | 7.52E-01 | 6.09E-01 | 9.03E-01 | 6.10E-01 | 4.92E-01 | 8.99E-01 | 4.31E-01 | 8.24E-01 |
| 1120 | 7.51E-01 | 6.69E-01 | 8.88E-01 | 6.05E-01 | 4.88E-01 | 9.02E-01 | 4.33E-01 | 8.24E-01 |
| 1140 | 7.46E-01 | 6.03E-01 | 9.02E-01 | 5.98E-01 | 4.84E-01 | 9.05E-01 | 4.35E-01 | 8.22E-01 |
| 1160 | 7.38E-01 | 5.97E-01 | 9.02E-01 | 5.88E-01 | 4.77E-01 | 9.07E-01 | 4.36E-01 | 8.16E-01 |
| 1180 | 7.22E-01 | 5.87E-01 | 9.02E-01 | 5.70E-01 | 4.68E-01 | 9.10E-01 | 4.36E-01 | 8.09E-01 |
| 1200 | 7.08E-01 | 5.79E-01 | 9.11E-01 | 5.56E-01 | 4.52E-01 | 9.12E-01 | 4.32E-01 | 7.89E-01 |
| 1220 | 7.11E-01 | 5.81E-01 | 9.05E-01 | 5.59E-01 | 4.42E-01 | 9.14E-01 | 4.31E-01 | 7.74E-01 |
| 1240 | 7.30E-01 | 5.92E-01 | 9.16E-01 | 5.73E-01 | 4.58E-01 | 9.15E-01 | 4.38E-01 | 8.06E-01 |
| 1260 | 7.35E-01 | 5.94E-01 | 9.09E-01 | 5.76E-01 | 4.58E-01 | 9.17E-01 | 4.37E-01 | 8.12E-01 |
| 1280 | 7.35E-01 | 5.94E-01 | 9.18E-01 | 5.74E-01 | 4.55E-01 | 9.18E-01 | 4.40E-01 | 8.13E-01 |
| 1300 | 7.35E-01 | 5.93E-01 | 9.13E-01 | 5.71E-01 | 4.52E-01 | 9.20E-01 | 4.41E-01 | 8.13E-01 |
| 1320 | 7.33E-01 | 5.92E-01 | 9.19E-01 | 5.68E-01 | 4.48E-01 | 9.21E-01 | 4.40E-01 | 8.13E-01 |
| 1340 | 7.31E-01 | 5.91E-01 | 9.16E-01 | 5.65E-01 | 4.43E-01 | 9.22E-01 | 4.43E-01 | 8.12E-01 |
| 1360 | 7.19E-01 | 5.83E-01 | 9.18E-01 | 5.50E-01 | 4.40E-01 | 9.22E-01 | 4.43E-01 | 8.12E-01 |

FIG 11 CONT'D
Reflectance - measured as for System One

Sample

| Wavelength nm | JJ | JS | SS | WW | JTS | MET | SC | TX |
|---|---|---|---|---|---|---|---|---|
| 1380 | 7.04E-01 | 5.72E-01 | 9.15E-01 | 5.35E-01 | 4.30E-01 | 9.24E-01 | 4.41E-01 | 8.00E-01 |
| 1400 | 6.99E-01 | 5.68E-01 | 9.18E-01 | 5.27E-01 | 4.22E-01 | 9.27E-01 | 4.41E-01 | 7.91E-01 |
| 1420 | 7.03E-01 | 5.72E-01 | 9.23E-01 | 5.31E-01 | 4.12E-01 | 9.27E-01 | 4.37E-01 | 7.83E-01 |
| 1440 | 7.05E-01 | 5.72E-01 | 9.22E-01 | 5.31E-01 | 4.10E-01 | 9.28E-01 | 4.40E-01 | 7.87E-01 |
| 1460 | 7.10E-01 | 5.74E-01 | 9.24E-01 | 5.32E-01 | 4.10E-01 | 9.28E-01 | 4.41E-01 | 7.93E-01 |
| 1480 | 7.11E-01 | 5.74E-01 | 9.24E-01 | 5.32E-01 | 4.08E-01 | 9.29E-01 | 4.43E-01 | 7.99E-01 |
| 1500 | 7.13E-01 | 5.76E-01 | 9.28E-01 | 5.32E-01 | 4.05E-01 | 9.29E-01 | 4.46E-01 | 8.01E-01 |
| 1520 | 7.15E-01 | 5.76E-01 | 9.29E-01 | 5.33E-01 | 4.00E-01 | 9.31E-01 | 4.47E-01 | 8.00E-01 |
| 1540 | 7.14E-01 | 5.76E-01 | 9.28E-01 | 5.31E-01 | 3.95E-01 | 9.31E-01 | 4.45E-01 | 7.96E-01 |
| 1560 | 7.13E-01 | 5.76E-01 | 9.32E-01 | 5.28E-01 | 3.93E-01 | 9.32E-01 | 4.45E-01 | 8.00E-01 |
| 1580 | 7.11E-01 | 5.73E-01 | 9.31E-01 | 5.24E-01 | 3.89E-01 | 9.33E-01 | 4.45E-01 | 8.00E-01 |
| 1600 | 7.09E-01 | 5.71E-01 | 9.28E-01 | 5.18E-01 | 3.84E-01 | 9.33E-01 | 4.45E-01 | 7.99E-01 |
| 1620 | 7.04E-01 | 5.67E-01 | 9.31E-01 | 5.13E-01 | 3.80E-01 | 9.34E-01 | 4.47E-01 | 7.98E-01 |
| 1640 | 7.00E-01 | 5.65E-01 | 9.28E-01 | 5.07E-01 | 3.75E-01 | 9.34E-01 | 4.46E-01 | 7.97E-01 |
| 1660 | 6.98E-01 | 5.64E-01 | 9.06E-01 | 5.05E-01 | 3.69E-01 | 9.36E-01 | 4.48E-01 | 7.94E-01 |
| 1680 | 6.82E-01 | 5.53E-01 | 9.21E-01 | 4.88E-01 | 3.61E-01 | 9.36E-01 | 4.45E-01 | 7.85E-01 |
| 1700 | 5.69E-01 | 4.75E-01 | 9.35E-01 | 3.86E-01 | 3.40E-01 | 9.38E-01 | 4.37E-01 | 7.70E-01 |
| 1720 | 5.41E-01 | 4.56E-01 | 9.32E-01 | 3.68E-01 | 2.86E-01 | 9.38E-01 | 4.13E-01 | 6.64E-01 |
| 1740 | 5.67E-01 | 4.73E-01 | 9.30E-01 | 3.86E-01 | 3.01E-01 | 9.39E-01 | 4.24E-01 | 6.91E-01 |
| 1760 | 5.93E-01 | 4.93E-01 | 9.34E-01 | 4.12E-01 | 2.89E-01 | 9.39E-01 | 4.17E-01 | 6.85E-01 |
| 1780 | 6.15E-01 | 5.07E-01 | 9.41E-01 | 4.24E-01 | 3.10E-01 | 9.38E-01 | 4.30E-01 | 7.32E-01 |
| 1800 | 6.17E-01 | 5.08E-01 | 9.35E-01 | 4.25E-01 | 3.06E-01 | 9.39E-01 | 4.31E-01 | 7.27E-01 |
| 1820 | 6.13E-01 | 5.45E-01 | 9.32E-01 | 4.20E-01 | 3.03E-01 | 9.40E-01 | 4.33E-01 | 7.24E-01 |
| 1840 | 6.27E-01 | 5.14E-01 | 9.37E-01 | 4.30E-01 | 3.04E-01 | 9.43E-01 | 4.40E-01 | 7.32E-01 |
| 1860 | 6.43E-01 | 5.26E-01 | 9.47E-01 | 4.44E-01 | 3.08E-01 | 9.41E-01 | 4.41E-01 | 7.47E-01 |
| 1880 | 6.43E-01 | 5.23E-01 | 9.42E-01 | 4.40E-01 | 3.08E-01 | 9.42E-01 | 4.43E-01 | 7.50E-01 |
| 1900 | 6.42E-01 | 5.24E-01 | 9.34E-01 | 4.38E-01 | 3.05E-01 | 9.39E-01 | 4.45E-01 | 7.52E-01 |
| 1920 | 6.41E-01 | 5.23E-01 | 9.34E-01 | 4.35E-01 | 3.00E-01 | 9.42E-01 | 4.43E-01 | 7.49E-01 |
| 1940 | 6.42E-01 | 5.23E-01 | 9.46E-01 | 4.34E-01 | 2.96E-01 | 9.43E-01 | 4.45E-01 | 7.50E-01 |
| 1960 | 6.40E-01 | 5.22E-01 | 9.49E-01 | 4.33E-01 | 2.93E-01 | 9.44E-01 | 4.46E-01 | 7.49E-01 |
| 1980 | 6.40E-01 | 5.22E-01 | 9.46E-01 | 4.31E-01 | 2.91E-01 | 9.47E-01 | 4.48E-01 | 7.54E-01 |
| 2000 | 6.50E-01 | 5.31E-01 | 9.44E-01 | 4.39E-01 | 2.88E-01 | 9.50E-01 | 4.50E-01 | 7.52E-01 |
| 2020 | 6.55E-01 | 5.34E-01 | 9.48E-01 | 4.44E-01 | 2.87E-01 | 9.54E-01 | 4.53E-01 | 7.56E-01 |
| 2040 | 6.56E-01 | 5.36E-01 | 9.63E-01 | 4.45E-01 | 2.85E-01 | 9.58E-01 | 4.51E-01 | 7.57E-01 |
| 2060 | 6.56E-01 | 5.37E-01 | 9.69E-01 | 4.41E-01 | 2.84E-01 | 9.59E-01 | 4.59E-01 | 7.60E-01 |
| 2080 | 6.58E-01 | 5.37E-01 | 9.59E-01 | 4.43E-01 | 2.88E-01 | 9.63E-01 | 4.65E-01 | 7.72E-01 |
| 2100 | 6.63E-01 | 5.40E-01 | 9.54E-01 | 4.45E-01 | 2.86E-01 | 9.65E-01 | 4.65E-01 | 7.75E-01 |
| 2120 | 6.66E-01 | 5.43E-01 | 9.39E-01 | 4.43E-01 | 2.88E-01 | 9.69E-01 | 4.64E-01 | 7.86E-01 |
| 2140 | 6.58E-01 | 5.37E-01 | 9.54E-01 | 4.39E-01 | 2.86E-01 | 9.67E-01 | 4.64E-01 | 7.80E-01 |
| 2160 | 6.51E-01 | 5.31E-01 | 9.65E-01 | 4.32E-01 | 2.81E-01 | 9.64E-01 | 4.64E-01 | 7.79E-01 |
| 2180 | 6.31E-01 | 5.14E-01 | 9.49E-01 | 4.10E-01 | 2.72E-01 | 9.58E-01 | 4.60E-01 | 7.68E-01 |
| 2200 | 6.24E-01 | 5.08E-01 | 9.47E-01 | 4.11E-01 | 2.63E-01 | 9.57E-01 | 4.49E-01 | 7.53E-01 |
| 2220 | 6.18E-01 | 5.35E-01 | 9.28E-01 | 4.05E-01 | 2.53E-01 | 9.52E-01 | 4.51E-01 | 7.40E-01 |
| 2240 | 5.91E-01 | 4.87E-01 | 9.00E-01 | 3.87E-01 | 2.50E-01 | 9.55E-01 | 4.47E-01 | 7.28E-01 |
| 2260 | 4.55E-01 | 3.83E-01 | 9.11E-01 | 2.81E-01 | 2.36E-01 | 9.53E-01 | 4.33E-01 | 7.01E-01 |
| 2280 | 3.75E-01 | 3.25E-01 | 9.37E-01 | 2.26E-01 | 2.10E-01 | 9.60E-01 | 4.07E-01 | 6.15E-01 |
| 2300 | 3.29E-01 | 2.87E-01 | 9.40E-01 | 2.03E-01 | 1.72E-01 | 9.63E-01 | 3.29E-01 | 4.44E-01 |
| 2320 | 3.13E-01 | 2.69E-01 | 9.24E-01 | 1.90E-01 | 1.88E-01 | 9.63E-01 | 3.85E-01 | 5.45E-01 |
| 2340 | 3.41E-01 | 2.94E-01 | 9.15E-01 | 2.07E-01 | 1.78E-01 | 9.68E-01 | 3.58E-01 | 5.05E-01 |
| 2360 | 3.13E-01 | 2.72E-01 | 9.09E-01 | 1.89E-01 | 1.85E-01 | 9.70E-01 | 3.66E-01 | 4.87E-01 |
| 2380 | 3.51E-01 | 3.60E-01 | 9.18E-01 | 2.20E-01 | 1.66E-01 | 9.77E-01 | 3.41E-01 | 4.27E-01 |
| 2400 | 3.40E-01 | 2.95E-01 | 9.37E-01 | 2.14E-01 | 1.69E-01 | 9.72E-01 | 3.44E-01 | 4.41E-01 |
| 2420 | 3.55E-01 | 3.66E-01 | 9.54E-01 | 2.15E-01 | 1.77E-01 | 9.80E-01 | 3.53E-01 | 4.55E-01 |
| 2440 | 3.80E-01 | 3.32E-01 | 9.06E-01 | 2.39E-01 | 1.77E-01 | 9.74E-01 | 3.63E-01 | 4.56E-01 |
| 2460 | 3.18E-01 | 2.64E-01 | 9.48E-01 | 1.92E-01 | 1.86E-01 | 9.81E-01 | 3.84E-01 | 5.47E-01 |
| 2480 | 3.92E-01 | 3.36E-01 | 9.51E-01 | 2.42E-01 | 1.91E-01 | 9.77E-01 | 4.03E-01 | 5.59E-01 |
| 2500 | 4.08E-01 | 3.32E-01 | 9.42E-01 | 2.58E-01 | 2.08E-01 | 9.78E-01 | 4.21E-01 | 6.04E-01 |

FIG 12

Transmittance - measured as for System One

Sample

| Wavelength nm | JJ | JS | SS | WW | JTS | MET | SC | TX |
|---|---|---|---|---|---|---|---|---|
| 280 | 1.36E-02 | 6.41E-02 | 9.29E-04 | 3.56E-03 | 4.61E-03 | 3.94E-02 | 3.69E-01 | 3.41E-02 |
| 300 | 6.87E-02 | 1.52E-01 | 1.73E-03 | 5.67E-03 | 3.70E-03 | 2.98E-02 | 5.30E-01 | 8.26E-02 |
| 320 | 8.84E-02 | 1.78E-01 | 1.91E-03 | 8.64E-03 | 7.41E-03 | 2.68E-02 | 5.71E-01 | 8.59E-02 |
| 340 | 1.18E-01 | 2.08E-01 | 3.15E-03 | 7.90E-03 | 5.66E-03 | 2.34E-02 | 5.99E-01 | 9.82E-02 |
| 360 | 1.32E-01 | 2.20E-01 | 2.81E-03 | 8.53E-03 | 4.71E-03 | 2.14E-02 | 6.13E-01 | 1.06E-01 |
| 380 | 1.42E-01 | 2.27E-01 | 3.22E-03 | 1.36E-02 | 6.75E-03 | 1.92E-02 | 6.19E-01 | 1.08E-01 |
| 400 | 1.49E-01 | 2.32E-01 | 2.88E-03 | 9.69E-02 | 1.10E-01 | 1.74E-02 | 6.23E-01 | 1.10E-01 |
| 420 | 1.53E-01 | 2.35E-01 | 2.61E-03 | 2.16E-01 | 2.76E-01 | 1.60E-02 | 6.25E-01 | 1.11E-01 |
| 440 | 1.57E-01 | 2.38E-01 | 2.32E-03 | 2.24E-01 | 2.85E-01 | 1.49E-02 | 6.27E-01 | 1.12E-01 |
| 460 | 1.61E-01 | 2.41E-01 | 2.15E-03 | 2.30E-01 | 2.91E-01 | 1.38E-02 | 6.28E-01 | 1.13E-01 |
| 480 | 1.64E-01 | 2.44E-01 | 2.05E-03 | 2.35E-01 | 2.99E-01 | 1.28E-02 | 6.29E-01 | 1.14E-01 |
| 500 | 1.67E-01 | 2.47E-01 | 1.91E-03 | 2.41E-01 | 3.06E-01 | 1.19E-02 | 6.30E-01 | 1.15E-01 |
| 520 | 1.69E-01 | 2.50E-01 | 1.78E-03 | 2.47E-01 | 3.13E-01 | 1.10E-02 | 6.30E-01 | 1.16E-01 |
| 540 | 1.72E-01 | 2.53E-01 | 1.70E-03 | 2.52E-01 | 3.20E-01 | 1.05E-02 | 6.30E-01 | 1.16E-01 |
| 560 | 1.74E-01 | 2.55E-01 | 1.58E-03 | 2.57E-01 | 3.26E-01 | 1.01E-02 | 6.31E-01 | 1.17E-01 |
| 580 | 1.77E-01 | 2.57E-01 | 1.52E-03 | 2.62E-01 | 3.33E-01 | 1.10E-02 | 6.31E-01 | 1.18E-01 |
| 600 | 1.79E-01 | 2.60E-01 | 1.45E-03 | 2.67E-01 | 3.40E-01 | 1.17E-02 | 6.31E-01 | 1.19E-01 |
| 620 | 1.81E-01 | 2.63E-01 | 1.39E-03 | 2.72E-01 | 3.46E-01 | 1.14E-02 | 6.31E-01 | 1.20E-01 |
| 640 | 1.83E-01 | 2.64E-01 | 1.34E-03 | 2.75E-01 | 3.53E-01 | 1.11E-02 | 6.31E-01 | 1.22E-01 |
| 660 | 1.86E-01 | 2.66E-01 | 1.31E-03 | 2.80E-01 | 3.60E-01 | 1.08E-02 | 6.31E-01 | 1.23E-01 |
| 680 | 1.87E-01 | 2.68E-01 | 1.28E-03 | 2.85E-01 | 3.66E-01 | 1.05E-02 | 6.31E-01 | 1.23E-01 |
| 700 | 1.90E-01 | 2.71E-01 | 1.28E-03 | 2.90E-01 | 3.72E-01 | 1.03E-02 | 6.31E-01 | 1.24E-01 |
| 720 | 1.93E-01 | 2.73E-01 | 1.32E-03 | 2.95E-01 | 3.78E-01 | 1.02E-02 | 6.31E-01 | 1.25E-01 |
| 740 | 1.95E-01 | 2.76E-01 | 1.35E-03 | 3.01E-01 | 3.82E-01 | 1.03E-02 | 6.31E-01 | 1.26E-01 |
| 760 | 1.97E-01 | 2.77E-01 | 1.46E-03 | 3.03E-01 | 3.88E-01 | 1.05E-02 | 6.30E-01 | 1.27E-01 |
| 780 | 1.99E-01 | 2.78E-01 | 1.61E-03 | 3.08E-01 | 3.94E-01 | 1.10E-02 | 6.30E-01 | 1.28E-01 |
| 800 | 2.01E-01 | 2.80E-01 | 2.10E-03 | 3.12E-01 | 4.00E-01 | 1.18E-02 | 6.29E-01 | 1.29E-01 |
| 820 | 2.03E-01 | 2.81E-01 | 2.69E-03 | 3.17E-01 | 4.05E-01 | 1.28E-02 | 6.29E-01 | 1.30E-01 |
| 840 | 2.05E-01 | 2.83E-01 | 3.18E-03 | 3.21E-01 | 4.10E-01 | 1.39E-02 | 6.29E-01 | 1.31E-01 |
| 860 | 2.07E-01 | 2.85E-01 | 3.50E-03 | 3.25E-01 | 4.15E-01 | 1.47E-02 | 6.29E-01 | 1.32E-01 |
| 880 | 2.09E-01 | 2.88E-01 | 3.55E-03 | 3.29E-01 | 4.21E-01 | 1.50E-02 | 6.30E-01 | 1.33E-01 |
| 900 | 2.10E-01 | 2.90E-01 | 3.50E-03 | 3.32E-01 | 4.26E-01 | 1.50E-02 | 6.31E-01 | 1.33E-01 |
| 920 | 2.10E-01 | 2.92E-01 | 3.42E-03 | 3.35E-01 | 4.30E-01 | 1.47E-02 | 6.31E-01 | 1.34E-01 |
| 940 | 2.15E-01 | 2.96E-01 | 3.29E-03 | 3.40E-01 | 4.35E-01 | 1.43E-02 | 6.32E-01 | 1.35E-01 |
| 960 | 2.16E-01 | 2.99E-01 | 3.17E-03 | 3.45E-01 | 4.41E-01 | 1.39E-02 | 6.32E-01 | 1.37E-01 |
| 980 | 2.18E-01 | 3.02E-01 | 3.05E-03 | 3.50E-01 | 4.46E-01 | 1.34E-02 | 6.33E-01 | 1.38E-01 |
| 1000 | 2.19E-01 | 3.04E-01 | 2.77E-03 | 3.53E-01 | 4.51E-01 | 1.29E-02 | 6.33E-01 | 1.39E-01 |
| 1020 | 2.20E-01 | 3.08E-01 | 2.44E-03 | 3.58E-01 | 4.55E-01 | 1.29E-02 | 6.33E-01 | 1.39E-01 |
| 1040 | 2.22E-01 | 3.10E-01 | 2.29E-03 | 3.60E-01 | 4.54E-01 | 1.14E-02 | 6.33E-01 | 1.40E-01 |
| 1060 | 2.24E-01 | 3.12E-01 | 2.36E-03 | 3.64E-01 | 4.56E-01 | 1.22E-02 | 6.33E-01 | 1.42E-01 |
| 1080 | 2.26E-01 | 3.14E-01 | 2.17E-03 | 3.68E-01 | 4.59E-01 | 1.11E-02 | 6.33E-01 | 1.43E-01 |
| 1100 | 2.28E-01 | 3.16E-01 | 1.93E-03 | 3.72E-01 | 4.64E-01 | 1.10E-02 | 6.33E-01 | 1.45E-01 |
| 1120 | 2.32E-01 | 3.19E-01 | 1.68E-03 | 3.78E-01 | 4.68E-01 | 1.08E-02 | 6.33E-01 | 1.46E-01 |
| 1140 | 2.31E-01 | 3.18E-01 | 1.76E-03 | 3.80E-01 | 4.72E-01 | 1.12E-02 | 6.33E-01 | 1.46E-01 |
| 1160 | 2.28E-01 | 3.17E-01 | 1.58E-03 | 3.79E-01 | 4.71E-01 | 1.03E-02 | 6.32E-01 | 1.45E-01 |
| 1180 | 2.18E-01 | 3.11E-01 | 1.96E-03 | 3.72E-01 | 4.70E-01 | 9.81E-03 | 6.31E-01 | 1.43E-01 |
| 1200 | 2.13E-01 | 3.08E-01 | 2.04E-03 | 3.70E-01 | 4.62E-01 | 1.00E-02 | 6.29E-01 | 1.35E-01 |
| 1220 | 2.17E-01 | 3.11E-01 | - | 3.77E-01 | 4.60E-01 | 9.80E-03 | 6.28E-01 | 1.30E-01 |
| 1240 | 2.33E-01 | 3.25E-01 | - | 3.95E-01 | 4.84E-01 | 8.65E-03 | 6.32E-01 | 1.47E-01 |
| 1260 | 2.39E-01 | 3.30E-01 | - | 4.04E-01 | 4.92E-01 | 8.67E-03 | 6.32E-01 | 1.51E-01 |
| 1280 | 2.43E-01 | 3.32E-01 | - | 4.10E-01 | 4.98E-01 | 8.97E-03 | 6.33E-01 | 1.52E-01 |
| 1300 | 2.45E-01 | 3.35E-01 | - | 4.13E-01 | 5.02E-01 | 8.58E-03 | 6.33E-01 | 1.54E-01 |
| 1320 | 2.47E-01 | 3.37E-01 | - | 4.17E-01 | 5.06E-01 | 8.82E-03 | 6.33E-01 | 1.55E-01 |
| 1340 | 2.48E-01 | 3.39E-01 | - | 4.21E-01 | 5.11E-01 | 8.56E-03 | 6.33E-01 | 1.57E-01 |
| 1360 | 2.42E-01 | 3.39E-01 | - | 4.12E-01 | 5.23E-01 | 8.65E-03 | 6.35E-01 | 1.58E-01 |

FIG 12 CONT'D  Transmittance - measured as for System One

Sample

| Wavelength nm | JJ | JS | SS | WW | JTS | MET | SC | TX |
|---|---|---|---|---|---|---|---|---|
| 1380 | 2.35E-01 | 3.32E-01 | - | 4.12E-01 | 5.19E-01 | 9.48E-03 | 6.30E-01 | 1.55E-01 |
| 1400 | 2.31E-01 | 3.30E-01 | - | 4.12E-01 | 5.18E-01 | 8.88E-03 | 6.31E-01 | 1.52E-01 |
| 1420 | 2.39E-01 | 3.35E-01 | - | 4.18E-01 | 5.13E-01 | 8.48E-03 | 6.27E-01 | 1.47E-01 |
| 1440 | 2.41E-01 | 3.37E-01 | - | 4.26E-01 | 5.20E-01 | 7.87E-03 | 6.26E-01 | 1.51E-01 |
| 1460 | 2.47E-01 | 3.42E-01 | - | 4.32E-01 | 5.29E-01 | 7.62E-03 | 6.27E-01 | 1.55E-01 |
| 1480 | 2.52E-01 | 3.46E-01 | - | 4.40E-01 | 5.36E-01 | 8.29E-03 | 6.28E-01 | 1.60E-01 |
| 1500 | 2.55E-01 | 3.49E-01 | - | 4.45E-01 | 5.41E-01 | 8.37E-03 | 6.29E-01 | 1.62E-01 |
| 1520 | 2.59E-01 | 3.52E-01 | - | 4.51E-01 | 5.46E-01 | 7.98E-03 | 6.29E-01 | 1.64E-01 |
| 1540 | 2.62E-01 | 3.55E-01 | - | 4.56E-01 | 5.50E-01 | 8.03E-03 | 6.28E-01 | 1.62E-01 |
| 1560 | 2.64E-01 | 3.57E-01 | - | 4.60E-01 | 5.56E-01 | 8.08E-03 | 6.30E-01 | 1.67E-01 |
| 1580 | 2.65E-01 | 3.58E-01 | - | 4.64E-01 | 5.63E-01 | 7.99E-03 | 6.30E-01 | 1.69E-01 |
| 1600 | 2.66E-01 | 3.60E-01 | - | 4.65E-01 | 5.66E-01 | 7.71E-03 | 6.31E-01 | 1.70E-01 |
| 1620 | 2.65E-01 | 3.60E-01 | - | 4.67E-01 | 5.70E-01 | 8.16E-03 | 6.30E-01 | 1.71E-01 |
| 1640 | 2.62E-01 | 3.58E-01 | - | 4.68E-01 | 5.75E-01 | 7.69E-03 | 6.30E-01 | 1.72E-01 |
| 1660 | 2.63E-01 | 3.59E-01 | - | 4.69E-01 | 5.76E-01 | 7.99E-03 | 6.29E-01 | 1.71E-01 |
| 1680 | 2.53E-01 | 3.52E-01 | - | 4.62E-01 | 5.73E-01 | 8.38E-03 | 6.29E-01 | 1.66E-01 |
| 1700 | 1.76E-01 | 2.88E-01 | - | 3.77E-01 | 5.57E-01 | 7.40E-03 | 6.21E-01 | 1.57E-01 |
| 1720 | 1.59E-01 | 2.74E-01 | - | 3.70E-01 | 4.99E-01 | 7.04E-03 | 6.07E-01 | 1.09E-01 |
| 1740 | 1.76E-01 | 2.91E-01 | - | 3.91E-01 | 5.26E-01 | 5.52E-03 | 6.13E-01 | 1.25E-01 |
| 1760 | 1.99E-01 | 3.13E-01 | - | 4.18E-01 | 5.22E-01 | 5.43E-03 | 6.08E-01 | 1.23E-01 |
| 1780 | 2.18E-01 | 3.28E-01 | - | 4.33E-01 | 5.62E-01 | 8.72E-03 | 6.20E-01 | 1.45E-01 |
| 1800 | 2.18E-01 | 3.32E-01 | - | 4.39E-01 | 5.65E-01 | 5.88E-03 | 6.21E-01 | 1.45E-01 |
| 1820 | 2.20E-01 | 3.28E-01 | - | 4.42E-01 | 5.74E-01 | 4.23E-03 | 6.20E-01 | 1.44E-01 |
| 1840 | 2.27E-01 | 3.45E-01 | - | 4.52E-01 | 5.96E-01 | 6.36E-03 | 6.25E-01 | 1.50E-01 |
| 1860 | 2.48E-01 | 3.52E-01 | - | 4.71E-01 | 5.93E-01 | 4.92E-03 | 6.23E-01 | 1.61E-01 |
| 1880 | 2.49E-01 | 3.51E-01 | - | 4.71E-01 | 6.01E-01 | 6.78E-03 | 6.20E-01 | 1.64E-01 |
| 1900 | 2.51E-01 | 3.61E-01 | - | 4.75E-01 | 6.06E-01 | 6.91E-03 | 6.18E-01 | 1.69E-01 |
| 1920 | 2.49E-01 | 3.58E-01 | - | 4.82E-01 | 5.95E-01 | 4.46E-03 | 6.14E-01 | 1.63E-01 |
| 1940 | 2.51E-01 | 3.59E-01 | - | 4.85E-01 | 6.00E-01 | 7.62E-03 | 6.10E-01 | 1.62E-01 |
| 1960 | 2.52E-01 | 3.63E-01 | - | 4.82E-01 | 6.01E-01 | 6.68E-03 | 6.12E-01 | 1.68E-01 |
| 1980 | 2.52E-01 | 3.61E-01 | - | 4.89E-01 | 6.13E-01 | 6.65E-03 | 6.18E-01 | 1.71E-01 |
| 2000 | 2.62E-01 | 3.65E-01 | - | 4.97E-01 | 6.09E-01 | 8.57E-03 | 6.17E-01 | 1.64E-01 |
| 2020 | 2.51E-01 | 3.71E-01 | - | 5.09E-01 | 6.25E-01 | - | 6.22E-01 | 1.71E-01 |
| 2040 | 2.76E-01 | 3.78E-01 | - | 5.12E-01 | 6.25E-01 | - | 6.24E-01 | 1.72E-01 |
| 2060 | 2.71E-01 | 3.73E-01 | - | 5.18E-01 | 6.32E-01 | - | 6.26E-01 | 1.74E-01 |
| 2080 | 2.80E-01 | 3.86E-01 | - | 5.08E-01 | 6.44E-01 | - | 6.27E-01 | 1.75E-01 |
| 2100 | 2.85E-01 | 3.84E-01 | - | 5.18E-01 | 6.49E-01 | - | 6.23E-01 | 1.81E-01 |
| 2120 | 2.93E-01 | 3.84E-01 | - | 5.29E-01 | 6.57E-01 | - | 6.32E-01 | 1.95E-01 |
| 2140 | 2.79E-01 | 3.84E-01 | - | 5.18E-01 | 6.60E-01 | - | 6.23E-01 | 1.86E-01 |
| 2160 | 2.69E-01 | 3.82E-01 | - | 5.20E-01 | 6.68E-01 | - | 6.25E-01 | 1.95E-01 |
| 2180 | 2.74E-01 | 3.81E-01 | - | 5.10E-01 | 6.60E-01 | - | 6.28E-01 | 1.90E-01 |
| 2200 | 2.85E-01 | 3.74E-01 | - | 5.26E-01 | 6.65E-01 | - | 6.00E-01 | 1.86E-01 |
| 2220 | 2.45E-01 | 3.64E-01 | - | 5.19E-01 | 6.34E-01 | - | 6.20E-01 | 1.63E-01 |
| 2240 | 2.58E-01 | 3.64E-01 | - | 4.89E-01 | 6.40E-01 | - | 6.07E-01 | 1.62E-01 |
| 2260 | 1.46E-01 | 2.67E-01 | - | 3.99E-01 | 6.14E-01 | - | 6.00E-01 | 1.58E-01 |
| 2280 | 1.16E-01 | 2.06E-01 | - | 3.49E-01 | 5.80E-01 | - | 5.94E-01 | 1.17E-01 |
| 2300 | 7.75E-02 | 1.73E-01 | - | 3.23E-01 | 4.25E-01 | - | 5.12E-01 | 4.33E-02 |
| 2320 | 6.48E-02 | 1.64E-01 | - | 2.91E-01 | 5.31E-01 | - | 5.69E-01 | 8.47E-02 |
| 2340 | 7.23E-02 | 1.87E-01 | - | 3.23E-01 | 4.92E-01 | - | 5.35E-01 | 7.39E-02 |
| 2360 | 6.56E-02 | 1.59E-01 | - | 2.92E-01 | 5.17E-01 | - | 5.37E-01 | 6.94E-02 |
| 2380 | 8.33E-02 | 2.04E-01 | - | 3.14E-01 | 4.55E-01 | - | 5.34E-01 | 2.79E-02 |
| 2400 | 8.92E-02 | 1.98E-01 | - | 3.35E-01 | 4.65E-01 | - | 5.05E-01 | 4.79E-02 |
| 2420 | 9.71E-02 | 1.89E-01 | - | 3.41E-01 | 4.93E-01 | - | 5.39E-01 | 6.79E-02 |
| 2440 | 1.00E-01 | 2.35E-01 | - | 4.02E-01 | 5.02E-01 | - | 5.42E-01 | 3.33E-02 |
| 2460 | 5.80E-02 | 1.86E-01 | - | 3.16E-01 | 5.13E-01 | - | 5.53E-01 | 6.21E-02 |
| 2480 | 1.62E-01 | 2.67E-01 | - | 4.07E-01 | 5.73E-01 | - | 5.51E-01 | 9.63E-02 |
| 2500 | 1.45E-01 | 2.73E-01 | - | 4.27E-01 | 6.16E-01 | - | 5.66E-01 | 1.09E-01 |

PLANT TREATMENT MATERIAL AND METHOD

BACKGROUND OF THE INVENTION

1. Field of the Invention

The invention relates to plant treatment materials used to promote growth, and development of cultivated plants.

BACKGROUND ART

One approach to promoting plant growth and development is to place ground covers over the ground adjacent or near to the plant. These covers have been made with a variety of materials such as paper, plastic and organic plant materials e.g bark or straw. The materials may contain in addition to the base material, compounds such as pigments and dyes that also impart specific properties to the materials. Use of such covers gives a number of benefits including conserving soil moisture and controlling weed growth. Also, depending on the nature of the covers, light useful to the plants' environment may be reflected back upwards to the plant.

2. Description of the Prior Art

Currently known important ground covers are as follows:

Clear unpigmented plastic ground cover; Black pigmented plastic ground cover; Brown pigmented plastic ground cover; Green pigmented plastic ground cover;

Red pigmented plastic ground cover;

White pigmented plastic ground cover; White unpigmented plastic ground cover;

Silver pigmented plastic ground cover; Silver metallised plastic ground cover;

The clear, black, brown and green plastic ground covers warm the soil.

The red pigmented ground cover is designed to influence plant phytochromes that influence plant morphology.

The white pigmented and unpigmented plastic ground covers look to increase reflected light into the plant canopy. White pigmented ground covers are produced from plastic polymer pigmented with the white titanium dioxide pigment. Unpigmented white ground covers are produced by flattening many microfibres into a continuous sheet.

The silver pigmented and metallised plastic ground covers look to increase reflected light into the plant canopy. Silver pigmented ground covers are typically made from metal particles (commonly aluminium) placed into or onto plastic polymer. Silver metallised ground covers are produced from depositing a thin layer of metal (commonly aluminium) onto a plastic film or sheet, in a vacuum—vacuum metallising.

Paper or wood fibre based ground covers are based on their weed suppression and moisture retention properties, and are not highly reflective.

Generally in the design of a specific ground cover for a certain situation the greater the number and degree of the influences the ground cover can have on the plant or crop environment, the greater the total benefit or performance of the ground cover.

The crop species and variety, the plant component intended for harvest, the plant's physical environment and the plant's biological environment all influence the type of ground cover most preferred for a specific cropping situation. For example if soil warming is a limiting growth factor, then ground cover that assists soil warming will be preferred, or if production of anthocyanins for fruit coloration is critical then reflection of light of the correct wavelengths to increase anthocyanin production will be preferred.

In many cases to achieve one of the preferred benefits with known ground covers requires the compromise of another possible benefit. The applicant has now found that by using ground covers with particular reflectance and transmission properties unexpectedly good performance may be obtained.

SUMMARY OF THE INVENTION

It is an object of the invention to provide plant treatment materials and/or methods giving an enhanced environment for the plant leading to improved plant production and/or quality or at least to provide the public with a useful choice.

In accordance with one aspect of the invention there is provided a reflective plant treatment material comprising, at least one pigment and having high reflectance of UV (280–400 nm), visible (400–700 nm) and near infrared (700–800 nm) radiation, but allowing at least part transmission of radiation of 800–2500 nm. Preferably the material allows at least part transmission of radiation of most of the wavelength range 200–25000 mm including all of the range 4100–6100 nm. The material has a reflectance of at least 11% over the range 280–400 nm, of at least 15% over the visible wavelengths and at least 10% over the range 700–800 nm. In addition it has a transmittance of at least 4% over the range 1001–1650 nm, at least 2% over the range 1651–2500 nm and at least 1% over the range 4100–6100 nm.

For many preferred plant materials, more preferred plant materials and most preferred plant materials the reflectance and transmittance values are as in the relevant columns of Tables 1 and 2 respectively.

TABLE 1

REFLECTANCE VALUES OF PREFERRED PLANT TREATMENT MATERIALS

| | Total Reflectance | | | | |
|---|---|---|---|---|---|
| Wavelength (nm) | Preferred | More Preferred | Especially Preferred | Most Preferred | Most Especially Preferred |
| 280–300 | 13–86% | 23–86% | 27–86% | 37–86% | 37–80% |
| 301–360 | 12–90% | 23–90% | 33–90% | 41–90% | 41–83% |
| 361–380 | 13–90% | 23–90% | 37–90% | 51–90% | 51–84% |
| 381–420 | 17–90% | 29–90% | 43–90% | 51–90% | 51–84% |
| 421–700 | 37–90% | 37–90% | 44–90% | 54–90% | 54–84% |
| 701–1000 | 25–89% | 29–89% | 40–89% | 47–89% | 47–82% |
| 1001–1640 | 24–90% | 30–90% | 35–90% | 42–90% | 42–80% |

TABLE 1-continued

REFLECTANCE VALUES OF PREFERRED PLANT TREATMENT MATERIALS

| | Total Reflectance | | | | |
|---|---|---|---|---|---|
| Wavelength (nm) | Preferred | More Preferred | Especially Preferred | Most Preferred | Most Especially Preferred |
| 1641–2200 | 15–93% | 18–93% | 24–93% | 24–93% | 24–76% |
| 2201–2500 | 5–96% | 10–96% | 15–96% | 17–96% | 17–72% |

TABLE 2

TRANSMITTANCE VALUES OF PREFERRED PLANT TREATMENT MATERIALS

| | Transmittance | | | | |
|---|---|---|---|---|---|
| Wavelength (nm) | Preferred | More Preferred | Especially Preferred | Most Preferred | Most Especially Preferred |
| 280–300 | 0–87% | 0–77% | 0–75% | 0–63% | 0–63% |
| 301–360 | 0–88% | 0–77% | 2–67% | 2–59% | 3–59% |
| 361–380 | 0–87% | 0–77% | 5–63% | 5–49% | 8–49% |
| 381–420 | 0–83% | 0–71% | 6–57% | 6–49% | 11–49% |
| 421–700 | 7–63% | 7–63% | 9–56% | 9–46% | 12–46% |
| 701–1000 | 9–75% | 9–71% | 11–60% | 11–53% | 14–53% |
| 1001–1640 | 7–76% | 7–70% | 10–65% | 10–58% | 17–58% |
| 1641–2200 | 4–85% | 4–82% | 7–76% | 7–76% | 12–76% |
| 2201–2500 | 1–95% | 1–90% | 1–85% | 1–83% | 4–83% |
| 4100–6100 | 1–95% | 1–95% | 1–95% | 1–95% | 1–90% |
| 8100–10100 | 1–95% | 1–95% | 1–95% | 1–95% | 1–90% |

For the purposes of this specification reflectance and transmittance properties of a plant treatment material are as determined for the material before any field use and the reflectance values are for material without any air gaps, holes, slits or openings greater than 0.8 mm in or between the material. The reflectance and transmittance values occur at each wavelength at 1nm intervals across all of the range of wavelengths listed unless otherwise specified.

Reflectance and transmittance values are those obtainable when measured as detailed in Example 28 for reflectance and transmittance as specified in System One and transmittance in System Three.

Preferably the plant treatment material is a ground cover in the form of a sheet e.g. sheets prepared from extruded film. One preferred form is a sheet formed from woven tapes. Preferably the sheets do not have gaps, holes, slits or openings greater than 5 mm in or between the material so as to minimise unwanted plant growth through the sheets of material.

Preferably the plant treatment material comprises a plastic (including plastic polymers derived from cultivated plant materials) more preferably polyolefins such as polyethylene, polypropylene or mixtures thereof. Ethylene alpha-olefin and polyolefin elastomers are also preferred. Certain plastics are particularly useful when present as minor components. Ethylene vinyl acetate (EVA), Ethylene butyl acrylate (EBA) and Ethylene methyl acrylate (EMA) are useful for imparting elasticity. Polyesters may be present as a UV absorbing component and Polystyrene, Styrene-butadiene (SB), Acrylonitrile-butadiene-styrene (ABS), Styrene-acrylonitrile (SAN), Polyethylene terephthalate (PET), Polymethylmethacrylate (PMMA) and polycarbonate are useful as dye carriers. These plastics are also useful in other aspects of the invention. Starch and other plant polymers are often useful components to increase biodegradability.

Alternatively the plant treatment material may comprise paper, wood or cellulose fibre, starch based polymers, casein, latex or in any combination of the above and/or with petroleum derived plastic polymers.

In accordance with a second aspect of the invention there is provided a method of treating plants by providing them with a reflective plant treatment material comprising at least one pigment and having high reflectance of UV (280–400 nm), visible (400–700 nm) and near infrared (700–800 nm) radiation but allowing at least part transmission of radiation of 800–2500 nm.

In certain preferred embodiments of the invention, at least one pigment is a white pigment. Preferably the white pigment is chosen from zirconium, strontium, barium, magnesium and calcium pigments. Neodymium, tin, titanium and zinc pigments are (among others) useful in the invention usually as co-pigments. For example titanium dioxide is useful for reducing reflectance of UV light but by itself results in plant treatment materials that have UV reflectance that is insufficient to gain the benefits of the invention. Zirconium dioxide, magnesium zirconate, calcium zirconate, strontium zirconate, barium zirconate and zirconium silicate, calcium carbonate, barium sulphate, magnesium oxide, strontium carbonate and barium carbonate and mixtures of these pigments are preferred pigments. Barium titanate, magnesium titanate, strontium titanate, neodymium titanate, tin oxide, titanium dioxide, titanium oxide, zinc oxide, zinc sulphide and zinc sulphate are included among other pigments useful in the invention. Especially preferred pigments are zirconium dioxide, barium sulphate and calcium carbonate, with calcium carbonate being most preferred.

Preferred ground covers of the invention containing white pigments include 5–75% (preferably 5–50 especially 5–30 most preferably 5–25%) of calcium carbonate, barium sulphate or, magnesium oxide or mixtures of these, with calcium carbonate especially preferred. It is also preferred to additionally include 1–5% of zirconium dioxide, magnesium zirconate, calcium zirconate, strontium zirconate or mixtures of these zirconium containing pigments.

In other preferred embodiments of the invention, at least one pigment is a metallic pigment, preferably chosen from aluminium, magnesium, nickel, silver, tin and zinc, with aluminium being most preferred. Copper may also be used. In these embodiments the metallic pigment does not form a complete barrier to light.

In preferred embodiments of the invention there is provided a mono-orientated or biaxially orientated reflective material comprising a polymer or polymers and at least one metallic or one substantially white pigment, that when mixed with the polymer(s) to form a polymer/pigment mix, that when extruded and mono-orientated and/or biaxially-orientated provides increased reflectivity relative to the same material without mono-orientation or biaxial-orientation of the polymer and pigment(s) mixture.

The effect of this orientation is marked where without the orientation the polymer/pigment mixture has a relatively low opaqueness but on orientation the material is now thinner but the opaqueness is greatly increased.

Preferably the pigment that shows this reflectivity increase, when present in a polymer/pigment mixture that is mono-orientated and/or biaxially-orientated is a substantially white pigment, more preferably a metal salt or oxide. Most preferably the material is made from a polyolefin containing a white pigment, preferably calcium carbonate that has been uniaxially or biaxially orientated to create microvoid cells that assist with the development of the material's reflectance and transmittance properties. For many applications mono-orientation is preferred with tapes being stretched to a length of at least 5 times greater. The orientation of the polymer/pigment mixture also assists the development of thermic properties of the material.

A particularly preferred pigment for use in this aspect of the invention is blanc fixe, a precipitated form of barium sulphate obtained from manufacturing. The pigment is preferably processed to a fine micron size in the range 0.05 to 10 microns.

Another particularly preferred pigment for use in this aspect of the invention is calcium carbonate, as a mineral obtained from mining or as a precipitate from manufacturing. The pigment is preferably processed to a fine micron size in the range 0.05 to 10 microns preferably 0.5–3 microns, most preferably 0.7–1.0 micron. The mineral form is currently preferred.

In other preferred embodiments of the invention the mono-orientated or biaxially orientated reflective material comprises a metallic pigment (eg an aluminium pigment) showing a reflectivity increase or orientation. In these embodiments the metallic pigment does not form a complete barrier to light. For example the metallic pigment may be present as platelets allowing at least some wavelengths to pass through the material between the platelets. The metallic particles are aligned substantially parallel to the surface of the material and/or to create microvoids and/or macrovoids that assist with the development of the material's reflectance and transmittance properties.

The creation of the voids due to the orientation of the polymer/pigment combination is assisted by the type of polymer or polymers. The use of homopolymer propylene and/or random co-polymer of propylene and/or ethylene/propylene block co-polymer and/or co-monomer of ethylene and/or ethylene alpha-olefins and/or single site catalyst polyolefins and/or combinations of these polymers are particularly effective for the creation of the voids.

The production of polyolefin polymers based on what has been termed single site catalyst, or metallocine catalysts allow control over polymer architecture and are preferred polyolefins for orientation purposes.

A reflective plant treatment material comprising polymer (s) and at least one substantially white pigment that when mixed with the polymer(s) to form a polymer/pigment mixture, that when extruded and mono-orientated or biaxially-orientated provides increased reflectivity relative to the same material without mono-orientation or biaxial-orientation of the polymer(s) and pigment(s) mixture may be manufactured by treating a thick and wide plastic tape containing a pigment in a form allowing mono-orientation by stretching the tape to decrease its thickness and width and orientate the polymer(s) and pigment(s) mixture.

The development of this enhanced reflectivity of the polymer(s) and pigment(s) mixture is not limited to tapes. It can be also achieved by the mono-orientation of cast extruded film as a sheet. Additionally it can be also developed in blown film which is biaxially orientated and can also have greater orientation in one of the two orientation directions. This blown film can later be further orientated either mono-orientated or biaxially orientated.

The advantage of large aluminium platelets is that they have a higher percentage of reflected light as specular or direct light.

A reflective plant treatment material may be manufactured by a method comprising the placement of aluminium or other metallic pigment into polymer(s) with subsequent orientation by methods analogous to those described above for polymers comprising substantially white pigments. Maximisation of the reflectivity of metallic pigments with minimal "greying" or absorption of visible light is achieved using grades of aluminium pigments with high reflectivity of visible light, preferably having mean particle size of 10–500 microns, more preferably 20–200 microns most preferably 30–150 especially 40–80. ST 460 from Silberline Manufacturing US is a preferred aluminium pigment for this purpose. A loading of this pigment in the range 10–3500 microns (preferably 0.5–6% more preferably 1–4%) by weight is preferred for many applications. The disadvantage of large sized pigments is that to obtain good coverage or opacity in the plastic film requires greater concentration of pigment. Aluminium pigments as flakes or platelets may be placed into polymer and the polymer/pigment mixture is then orientated such that the platelets are aligned along the orientated plastic film. This orientation maximises the coverage obtainable from the pigment and assists the economic use of the larger and/or expensive specialized aluminium pigments and the use of lower levels of pigmentation generally. The use of platelets of aluminium allows the development of air pockets around the platelets, adding to the thermic properties of the resulting material. This is particularly the case for mono-orientation of tapes used for a woven type ground cover. The mono-orientation gives enhanced alignment of the aluminium or metallic platelets/flakes. In this embodiment dyes and UV absorbers may be included in the tapes without substantial diminution of the specular nature of the reflected light. Combining the metallic pigments with the 280–800 nm reflecting white pigments used in the invention within the same tapes is not preferred as those white pigments will decrease the specular content of the reflected light.

In some preferred embodiments of the invention the reflectance of the plant treatment material for wavelengths in the range 350–800 nm is greater than 25%, preferably greater than 40%. In other preferred embodiments, the reflectance in that wavelength range is greater than 25%, preferably greater than 40% for the base pigment(s) of the plant treatment material, but this is modified at some wavelengths by additional pigment(s)/polymer(s). For many uses which are not adversely affected by high reflectance of wavelengths below 350 nm the range for reflectance greater than 25% (or 40%) is usefully extended to 320–800 nm, 300–800 nm, or 280–800 nm. Whether this is beneficial depends on factors such as type of crop, as is discussed below.

In a preferred embodiment of the invention, the plant treatment material further comprises at least one additional layer or layers of material coated onto one or both surfaces of the material comprising further polymers and pigments to modify the reflective, transmission and absorbent properties of the ground cover.

In further preferred embodiments of the invention additional pigments are included in the plant treatment material in the same layer as the pigments that when mixed with the polymer(s) to form a polymer/pigment mixture and extruded and mono-orientated, and/or biaxially-orientated provide increased reflectivity relative to the same material without mono-orientation or biaxial orientation of the polymer(s) and pigment(s) mixture.

A ground cover of the invention may be a sheet prepared from extruded film that may have one or more layers which may have different polymers and/or pigments/dyes combination.

In other preferred embodiments the sheet is prepared from tapes that are woven together. The tapes may be made from different combinations of polymer and/or pigments/dyes to impart various combinations on the resulting sheets' reflectance and transmittance properties.

The separation of different polymer and/or pigments is a useful design feature in that it allows the separation of different polymer and/or pigments in that it allows separation of different polymer and/or pigments that if mixed together produce a less desirable effect.

For example, radiation, in particular visible light (400–700 nm), from the sun on a cloudless day is the prominent form of direct light. On striking a white surface the reflected light is scattered into predominantly diffuse light. In contrast, if the direct light strikes a metallic surface such as aluminium, the reflected light has a much larger amount of direct light.

Direct light has the advantage of travelling further than diffuse light but it has the disadvantage in that it can be reflected out past the plant to be lost for any plant benefit. A high proportion of direct light can also lead to high concentrations of light in localised areas of leaves and fruit. This can lead to high temperatures and/or very high light levels that can cause sunburning and/or leaves to stop photosynthesising.

A combination of direct and diffuse light is considered by the applicant superior for some plant crops.

The mixing of white pigments and metallic pigments leads to the result of reducing the direct light reflected by the metallic component. The separation of white and metallic components produces a plant treatment material that has more superior features from some crops than if mixed together or provided singularly.

The separation of the different polymer and/or pigments/dyes can also have application across the width of the ground cover. This has application where it is desirable to vary the reflectance and/or transmittance properties across the ground cover. For example in an orchard situation with fruit trees, the cover that is in or nearest to the centre of the inner tree row area could have more direct light while the ground cover under the tree has more diffuse light. This would potentially give more optimum use of incoming solar radiation.

The separation of different pigments and/or dyes and/or polymers can be achieved in a number of ways.

For woven material this can be achieved by having the components separated into individual tapes. Thus when the tapes are woven together, the individual components come together to make a composite material to give a combined effect of both of these specific reflectance and transmittance properties.

Thus the warp tapes (lengthwise direction) could be one component for example aluminium pigmented tapes and the weft tapes (crosswise direction) white tapes containing calcium carbonate that is orientated to generate microvoids. By weaving these two types of tapes together we can achieve a material with reflective and transmittance properties that are a composite of the two individual tapes.

Variations can be created with the above two types of tape by instead of placing all of the aluminium tapes into the warp, part could be placed into the weft and vice versa for the white tapes. By varying these arrangements we can obtain a range of materials with varying reflectance and transmittance properties.

For example if the warp tapes were aluminium tapes alternated with white (polymer and calcium carbonate that has been orientated) tapes then the same for the weft we would have a material that was a combination of 25% white on white, 25% white on aluminium, 25% aluminium on white and 25% aluminium on aluminium. If the aluminium tapes are constructed to give high transmittance of solar radiation in the daytime and moderate to high transmittance of infrared radiation of soil warmth at night time thus we would have a material to transfer daytime warmth to night time. (This would benefit frost prone regions). This material would have different reflectance and transmittance properties from a material woven where the aluminium tapes were all in the warp and white tapes were all in the weft.

Being able to alter the architecture or construction of the cover we are able to create a material for specific plant cropping situations. Additional variation can be obtained to a woven product by coating the woven material with a layer or polymer and/or pigments and/or dyes. The coating layer on one or two sides will be adding an additional component to the woven material to influence the reflectance and transmittance. Additionally it may be added to influence the water and water vapour movement through the material.

Separation could also be achieved by producing (two or more mixes) of extruded tapes, such that separate mixes are put through the same die head simultaneously but joined only at the surface.

Alternatively, a woven material could be printed on one or more sides to achieve separation of the mixes.

Alternatively, a woven material could have a combination of part or complete coating and/or printing to achieve the separation of the mixes.

Printing of the mixture or mixtures could also be done in strips along the length of the material to achieve mixture variation across the width of the material.

For a film material, the separation of the pigments and/or dyes and/or polymers can be achieved in a number of ways, as follows:

Co-extruded film (two or more layers) can produce layers of film joined at the surface but without mixing. This would achieve separate of the mixes.

Alternatively a film, (single or co-extruded) could be printed on one or more sides to achieve the separation of the mixes.

Printing of the mixture or mixtures could be done in strips along the length of the material to achieve variation across the width of the material. The extrusion could also be done like this.

As an alternative to printing a layer, in particular a metallic layer such as aluminium, the layer could be applied to the extruded film (single layered and co-extruded) by vacuum metallising whereby the metallised layer is applied not as a continuous layer such that it does not cover 100% of the film or woven base/layer material.

Alternatively the metallised layer is applied uniformly across the base layer and then it is treated in such a way that they continuous metallised layer is partly removed to render it incomplete. It then could have further layers added to it, if required, to form the end material.

Ground covers that use a complete metallic layer have some disadvantage in that the metallic layer can induce excessive concentrations of reflected solar radiation in a plant's canopy that can have visual sunburning and/or have plant photosynthesis being partly stopped or reduced in efficiency.

The metallic layer also tends to restrict soil warming by not allowing any significant transmittance of radiation through the material, in fact soil cooling can be in effect.

By presenting the metallic layer as an incomplete layer such that it covers only 1–97% preferably 2–80%, more preferably 5–50% we have a layer that can have the influence of the metallic layer plus the adjacent layer. This layer could have a number of properties as an unpigmented polymer or partly pigmented polymer, or a fully pigmented polymer layer. Preferably the non-complete layer is coated onto one surface of a substantially white material of the invention described above. For example, a base layer containing mono-orientated barium sulphate can be printed with a coating in a regular pattern such that 50% of the surface is coated. If the coating was by printing with aluminium, this would result in a ground cover material having portions showing the characteristics of the aluminium coating (reflection of specular light, and reflectance of the infra-red while the remainder of the material showed the reflectance and transmission characteristics of the base layer). Instead of printing the aluminium, it could be 50% metallised directly or applied by laminating a 50% metallised plastic film or aluminium pigments incorporated in a plastic polymer(s) coating layer to give a 50% coverage. In the case of laminating with a 50% metallised plastic film or with a coating layer containing aluminium pigments, the aluminium forms an incomplete layer while the plastic carrier forms a complete physical layer. In other embodiments of this aspect of the invention the incomplete coverage of metallic pigments (eg aluminium) is applied onto white pigmented materials that are UV absorbers like titanium dioxide ground covers or to clear, or green coloured or paper ground covers. Silvet 460 from Silberline Manufacturing (USA) is a preferred aluminium pigment for this purpose.

The incomplete layer can be made in a number of ways such as a partial metallised layer or a partial pigmented layer.

The partial metallised layer is produced by restricting the complete coverage of the metallising metal or partial removal after metallising.

The partial pigmented layer is produced by adding the concentration of metallic pigment to the ink or in the polymer system so that in printing or extrusion the coverage is incomplete.

Alternatively a complete layer of the metallic pigment could be added as an ink that is printed only on a part of the surface or part of the layer is applied via a pigment in a coating or layer.

For a woven material if only some of the tapes in one woven direction are aluminium or the tapes contain in incomplete layer of aluminium then we will have an incomplete layer.

The use of the metallic component in the material is used particularly to generate a proportion of direct light. The metallic component is preferably aluminium and is provided as a vapour in the vacuum metallising application or as a pigment and added via an ink system or into a polymer.

In the case of a metallic pigment system, the choice of the pigment with a large particle size is preferred. The smaller the particle size the greater the percentage of particle edges and hence the greater the diffuse and/or metallic greying effect.

The larger metallic pigments (10–3500 micron mean particle size preferably 1–500 micron, more preferably 40–80 micron) may be presented as platelets (where their length is many times their thickness) which when introduced to the material via the printed ink or as a pigment into the polymer they can be induced to favour the alignment of the platelet so that the long side of the platelets parallels the surface of the material to maximise the reflective surface from the metallic particle.

The nature of the ink application system and the extrusion and/or the orientation of the polymer/pigment mixture assists this parallel alignment.

The metallic pigments tend to align in the parallel direction but there is a variation in the alignment such that the reflected light is scattered in many directions to the surface. This feature is advantageous to minimising the effect that can occur from metallic materials that tend to concentrate the reflected solar radiation into locations that can cause sunburning on the plant's leaves and/or fruits or effects not so visibly obvious such as the stopping of photosynthesis in large or localised areas of the plant's canopy.

One feature of the invention in contrast to known silver ground covers containing aluminium is that the reflecting layer allows at least partial transmission of wave lengths of 800–25000 nm. The partial transmissibility of wavelengths in the range 800–2500 allows measurable soil warming, relative to a silver aluminium pigmented plastic ground cover. Of course if the required soil warming can still be obtained by having partial aluminium coating it can be useful to use partial aluminium coating to obtain some of the benefits of the reflectivity of aluminium. The partial transmissibility of wavelengths in the range 2500–25000 nm is to an extent allow re-radiation of heat from soil to air particularly at night sufficient to allow soil heat to move upwards into the plants' environment relative to a silver aluminium pigmented ground cover. It also allows heat radiation from the air to the soil, in situations where the air temperature is greater than the soil temperature.

One other feature of the invention in contrast to the known silver ground covers containing aluminium is that the reflecting layer may allow at least partial (even though quite low, but higher than aluminium) transmission of wavelengths 400–800 nm. Wavelengths in this range (400–800 nm) are useful for soil warming and in particular for plant photosynthesis. Allowing a slight transmission of light in the 400–800 nm light region allows plant- growth beneath the ground cover. This plant growth is restricted by the physical barrier of the ground cover and the limited amount of photosynthetically active light it is receiving. Because of this the plant growth beneath the ground cover does not become excessively vigorous to compete with the plant above the ground cover, that is the primary cultivated plant. The presence of plants, beneath the ground cover in some situations is considered beneficial, as it allows the maintenance of the soil structure, the input of organic material into the soil beneath the ground cover and keeps the cover slightly off the soil surface. For many applications the preferred transmission percentages are in the range 2 to 30% preferably 5 to 20%, more preferably 10–20%. In certain embodiments some transmission of wavelengths 280–400 nm is also used as this is useful for soil warming.

For desirable wavelengths, ground covers preferably reflect or transmit most of the light for benefits to plants via increased light or by soil warming. For these wavelengths absorption by the ground cover is kept to a minimum.

In preferred embodiments of the invention, the ground cover further comprises an additional layer of material coated onto one surface of the material comprising further pigments and/or polymers to modify the reflective and absorbent properties of the material. This embodiment is particularly preferred when the further pigments and/or polymers are incompatible with the pigments in the base layer or need to be incorporated into a different polymer type, e.g. polyester v polypropylene or where the incorporation into a different layer aids in the reduction of manufacturing costs.

In other preferred embodiments of the invention further pigments and/or polymers are included in the ground cover in the same layer as at least one pigment having high reflectance of UV, visible and near infrared radiation, but allowing at least partial transmission of radiation of 800–2500 nm and 2500–25000 nm.

In a further embodiment the base layer is clear plastic film printed with white pigments covering 1–97% of the area and/or printed with aluminium 2–80%.

Pigments which may be used to modify the reflection and transmission of the base layer of the material include white pigments with varying degrees of UV reflection or absorption. Pigments having the potential for this function include titanium dioxide, barium titanate, lithium titanate, magnesium titanate strontium titanate, potassium titanate, bismuth titanate, zinc oxide, zinc sulphate and zinc sulphide and mixtures of these pigments.

Additionally the use of specific plastic polymers to influence the reflection and transmission properties of the ground cover can be used. For example polyester which is an absorber of the shorter wavelengths of UV and/or EVA, a transmitter of short wave infra red and a block to long wave infra red radiation, can be incorporated into the system to modify the reflection and transmission of the base layer. In some cases the modifying polymer can be added to the base layer polymers directly rather than to the coating or top layer.

The specific choice of the base white and regulating white can also influence plant growth regulation systems. Other pigments may be included to further influence the balance between the plant growth regulating systems cryptochromes, phytochromes, the UV photoreceptor, and the balance between the UV and blue light reflected to the plants. Pigments useful for this function are typically coloured rather than white and may include:

Inorganic pigments such as cobalt aluminium oxide, cobalt (aluminium, chrome) oxide, titanium (nickel, antimony) oxide and titanium (chrome, antimony) oxide; or Organic pigments/dyes such as quinacridone red, carbazole dioxazine violet, isoindolinone yellow, copper phthalocyanine blue and dichloroquinacridone magenta, perylene violet, perrindo maroon, perrindo red, indofast brilliant scarlet, quindo violet, palomar green or Micas coated with metal oxides or Metals such as aluminium, zinc, tin and copper or A mixture of these pigments.

Fluorescent dyes and pigments may also be used. These have particular potential application to influence the cryptochrome, phytochrome and the UV photoreceptor and the UV/blue light balance by absorbing light in one wavelength band and emitting it as another wave length band more useful in the desired application. Those useful for this function include Lumogen green, Lumogen orange, Lumogen red, Lumogen violet, Allplast Red SB and Macrolex Fluorescent Red G. Garobrite OB is also useful for this function. Lumogen red, Aliplast Red 5B and Macrolex Fluorescent Red G are preferred.

Additional pigments to affect the reflective and transmission properties are: Magnesium silicate, aluminium silicate, silica, aluminium potassium silicate, calcium metasilicate, sierra chlorite, calcined clay, clay and metaphosphate are particularly relevant for influencing the infrared wave lengths. Carbon black may also be used to affect the transmission and reflective properties.

Particularly preferred pigments for modifying the properties of the base white pigment are ultrafine titanium dioxide, ultrafine zinc oxide, Macrolex Fluorescent Red G, Lumogen Red, Allplast Red SB, Cobalt Aluminium Oxide, Cobalt (aluminium chrome) oxide, and combinations of these pigments.

The use of a combination of plastic polymers may be used to aid in the stability and/or solubility of some pigments or dyes in the system. Where the pigment/dye is not stable in the base polymer(s), a polymer(s) is added that aids this stability of the pigment/dye in the system.

The pigments/dyes can also be applied via an ink system that also avoids the addition to the polyolefin system.

The woven material produced from tapes and/or threads does offer the possibility of adding the pigments/dyes to the total system without using the polyolefin polymer.

In some cases these pigments/dyes, to impart their effect on the system are only required as a smaller part of the total system.

Some of the polymers such as polystyrene, styrene butadiene, acrylonitrile—butadiene—styrene, styrene—acrylonitrile, polyethylene terephthalate, polymethyl methacrylate and polycarbonate are useful polymers for these purposes. Polyamide may also be used.

It is also preferred to add one or more stabilisers to ensure the material has an economic life. Possible stabilisers but not exclusively are as follows:

A0-1, Irganox 1010, Irganox 1035, Irganox 1076, Irganox 1330, Irganox 1425 WL, Irganox 3114, Irganox MD 1024, Irgafos 168, Irgafos P-EPQ, Irganox PS800, Tinuvin 326, Tinuvin 327, Tinuvin 328, Tinuvin 492, Tinuvin 494, Irganox PS802, Tinuvin 622, Tinuvin 765, Tinuvin 770, Tinuvin 791, Chimassorb 81, Chimassorb 119, Chimassorb 944, Chimassorb N-705, Ni-Quencher and Calcium Stearate.

In addition to the polymers/pigments/dyes and stabilisers the material could have other additives such as slip, antiblock, antistatic, processing aids, antislip, algaecides, bactericides, fungicides, pesticides, fertilisers and the like added to enhance its performance in manufacturing and application.

As mentioned above, in relation to aluminium, compounds may be added to increase reflection of infra-red radiation. Aluminium, zinc, tin and copper have this function. Aluminium is a preferred material for use in additional coatings, particularly partial coatings. Aluminium reflects specular light. The advantage of specular light in horticulture is that it travels further up into plants than diffuse light. Thus adding a partial coat of aluminium on top of a white base layer, not only aids infra-red regulation, but also gives a mixture of specular and diffuse reflected light. These benefits are also available using zinc, tin and copper or other metals. Aluminium can be printed onto the base layer, metallised directly or added by laminating a 1–97% metallised plastic film. Aluminium can also be incorporated in a polymer coating layer, as a pigment, or added to the system as a pigment to the base layer. If this is done the aluminium is not mixed with white pigments in the same plastic layer or tape, as this would reduce the specular reflected light.

Ground covers of the invention can be simply prepared by weaving tapes containing, for example zirconium dioxide and barium sulphate. Preferably the tapes are made from polypropylene, polyethylene, or a mixture of these polymers, most preferably polypropylene, prepared by methods known to those skilled in the art. If the basic film is to be used without the addition of one or more further layers, the thickness is preferably in the range of 5 to 300 microns. The amount of pigment is preferably in the range of 5 to 75% by weight, more preferably 5 to 50% by weight, most preferably 5–30% or 5–25%. The thickness of the base layer containing the pigments reflecting UV, visible and near infrared radiation is preferably in the range of 10 to 200 microns when a further layer containing other pigments is to be coated on to it. The woven material by its construction has space between individual tapes that water and air movement can move through. In some applications this movement is excessive and restriction would be an advantage. Additionally the space is also an opportunity for algae and/or dirt to collect.

This space can be partly or completely reduced by the application of heat and pressure to the woven material such that the tapes develop adhesion to each other. In this case it is advantageous to mix in the woven material's components that are activated in response to the heat and/or pressure.

Adhesives could also be applied after the woven material is made to assist in the closing of the space between the tapes.

One particular combination that is useful is the addition of an ethylene alpha-olefin to the base polyolefin, (preferably polypropylene or polyethylene). This material is noted for its lower melt temperature (than the polyolefin base) and adhesion properties. When applied in a concentration of 5–50% to base polyolefin, then extruded woven into a material, temperature and pressure may be applied such that the ethylene alpha-olefin adhesion properties are activated, with the temperature and pressure should be insufficient to markedly affect the woven material's base polyolefin.

In a preferred form of the invention the reflecting tapes are weaved and sealed with a clear polymer coating to prevent algae and dirt gathering in gaps between tapes and to protect the printed or metallised aluminium layer. The polymer coating to prevent the algae and dirt gathering in the gaps between taps may also contain the pigment/dyes to modify the reflected light of the base layer. Then the ground cover material is perforated with the perforations having a diameter of 0.1 to 5 mm and a aperture ratio of 0.1–10% to provide air and water movement, although for some applications the ground cover is unperforated. Preferably at least some of the tapes are tapes containing mono-orientated polymer/pigment mixture.

The material may (or may not) be perforated to increase the water and air movement through the material. In some cases no perforations are advantageous in others perforations are advantageous.

Some of the materials, depending on construction methods used, will not require any perforations. If perforations are made they could be from drilled or punctured holes 1–20 mm in diameter or slits from 1–20 mm or even to 200 mm, in length.

Some of the woven materials will not require any perforation as due to their construction they allow direct water and air movement through the material.

An alternative manufacturing method to alter permeability for the woven material is to vary the tightness of the weave. A woven product from tapes is woven such that the tapes are placed together without any tape folding this generates a moderately loose weave that is readily permeable. As the number of weft tapes increases per length of the warp tapes, they are placed together tightly, some folding may occur, this decreases the permeability of the material.

This method allows a range of permeability to be achieved to match the need of the horticultural situation.

Another alternative is to coat the tapes but allow the edges to remain uncoated. This allows the ground staples or pins placed through the material into the soil to pass through this uncoated area. This allows the coated material more flexibility like an uncoated woven material. This has particular advantage when the ground cover is driven over by a tractor or the like. On coating, a woven ground cover loses some of the flexibility that it had when uncoated. This loss of flexibility is noticeable when a tractor drives over the woven ground cover that is coated. The tractor tends to pull and dislodge the ground staples or pins that hold the ground cover to the ground. This problem is reduced if a coated ground cover is uncoated around where it is pinned to the ground.

Ground covers of the invention with mono-orientated polymer and pigment can be simply prepared from tapes containing, for example 1–50% finely ground precipitated barium sulphate and preferably tapes are made from polypropylene, polyethylene or a mixture of these polymers, most preferably polypropylene, prepared by methods known to those skilled in the art. The tapes may then be stretched at a temperature of 100–150° C. to decrease the thickness and width of the tape to a quarter to a tenth of the original width. Stretching at about 120° C. is appropriate for polypropylene. If the basic film is to be used without the addition of one or more further layers, the thickness is preferably in the range of 5 to 300 microns. The amount of pigment is preferably in the range of 5 to 75% by weight, more preferably 5 to 50% by weight most preferably 5–30% or 5–25% by weight. The thickness of the layer containing the orientated pigment polymer and pigment mixture is preferably in the range of 5 to 200 microns when a further layer containing modified pigments is to be coated on to it. In a preferred form of this embodiment of the invention, the reflecting tapes are weaved and sealed with a clear polymer coating, then perforated with the perforations having a diameter of 0.1 to 20 mm and a aperture ratio of 0.1–10% to provide air and water movement, although for some applications the ground cover is unperforated.

Mono-orientation and/or biaxial-orientation of the polymer and pigment mixture can have a very striking effect on the reflecting properties of the material. When barium sulphate is used as a pigment in the polymer/pigment mixture that is mono-orientated and/or bi-axially orientated the reflectance may be increased by up to 3–5 times. More modest increases in reflectance may be obtained when mineral or coarser barium sulphate is used. With different materials the gains from mono-orientation or biaxial-orientation vary.

Ground covers containing 5–30% calcium carbonate, magnesium oxide or barium sulphate are especially preferred. Inclusion of 1–5% of a pigment chosen from zirconium dioxide, calcium zirconate and magnesium oxide as a second pigment is also preferred for many applications.

Of course many pigments by virtue of their structure do not give any significant increase in reflectivity when the polymer/pigment mixture is mono-orientated or biaxially-orientated. The commonly used white pigment titanium dioxide is an example of such a pigment.

The present invention allows design of ground covers with a great range of properties to provide for different horticultural applications. The white pigments/dyes used may give reflection of solar radiation including the UV spectrum but the UV absorbing pigments/dyes and polymers may be used to regulate the reflectance in the part of the UV spectrum. Mono-orientation or biaxial-orientation of polymers and polymer pigment combinations provides an option for increasing reflectivity. The white base material may be partially covered with pigments such as aluminium to regulate reflection/transmission of the infra-red and/or to obtain mixed reflection of specular and diffuse light. The white pigmented material or white pigmented material partially covered with pigment such as aluminium may be coated with plastic/polymer layers containing UV absorbing pigments/dyes or polymers to regulate UV reflectivity of the base material. Any of the materials described above may be coated with material absorbing in parts of the 280–800 nm range to regulate the reflectivity of the base materials and to influence the plants light environment and potentially influence the plants growth/development and its environment. Furthermore any of the materials so far described can also be coated with a layer containing fluorescent dyes that alter the wavelengths of the reflected light to influence the plant growth/development and its environment.

Alternatively the aluminium pigments, UV absorbing pigments/dyes, 280–800 nm absorbing coloured pigments/dyes, fluorescent pigments/dyes and particular plastic polymer mixtures could be added to the base material. They can be added in such a way that they are added to one tape or film as a mixture or as different tapes woven into one woven film or as film with different sections of each component via cast extrusion such that the ground cover varies across its width and/or in the layers as in a coextruded film. The mixture of aluminium pigments with the white base pigments is not preferable, as the white pigments decrease the specular reflection of the aluminium pigment. The UV absorbing coloured or fluorescent pigments/dyes could be mixed with the aluminium pigments.

A particularly useful combination is to have a base layer containing one or more white pigments coated with an infra-red specular layer comprising a partial coating of metal pigments and on top of that a second coating comprising materials chosen from UV absorbers, coloured pigments/dyes, and fluorescent pigments/dyes, and also mixtures thereof. This second coating is used to influence plant growth and development by varying the portions of light of different wavelengths in the 280–800 nm region. One of the advantages of having the metal layer beneath the coating containing the pigments/dyes that influence the 280–800 nm region, is that the influence is borne as specular reflected light to the plants and its environment. An alternative is to mix the metal pigment with UV absorbers coloured pigment (s)/dye(s) and/or fluorescent pigment(s)/dye(s) into one film or tape to obtain a combined diffuse/specular reflected light to influence plant growth and development.

In an especially preferred embodiment of the invention the plant treatment material is such that the component that is made of a continuous sheet, that is excluding any air gaps or openings in the material, has the following reflection and transmission properties:

Total reflectance (diffuse and specular light/radiation) of UV from 280–300 nm of 11–90%, preferably 30–90% or most preferably 40–90%

Total reflectance (diffuse and specular light/radiation) of UV from 301–400 nm of 11–90%, preferably 40–90% or most preferably 55–90%.

Total reflectance (diffuse and specular light/radiation) of visible light from 401–700 nm of 15–90%, preferably 40–90% or most preferably 60–90%.

Total reflectance (diffuse and specular light/radiation) of radiation from 701–1100 nm of 10–90%, preferably 30–85% or most preferably 50–85%.

Total reflectance (diffuse and specular light/radiation) of radiation from 1101–1650 nm of 10–90%, preferably 30–85% or most preferably 50–85%.

Total reflectance (diffuse and specular light/radiation) of radiation from 1651–2250 nm of 10–85%, preferably 25–80% or most preferably 40–75%.

Total reflectance (diffuse and specular light/radiation) of radiation from 2251–2500 nm of 10–75%, preferably 15–70% or most preferably 25–60%.

Total transmittance (diffuse and specular light/radiation) of radiation from 280–300 nm is 0–80%, preferably 2–50% or most preferably 2–30%.

Total transmittance (diffuse and specular light/radiation) of radiation from 301–400 nm is 0–80%, preferably 4–50% or most preferably 4–30%.

Total transmittance (diffuse and specular light/radiation) of radiation from 400–700 nm is 5–80%, preferably 10–60% or most preferably 10–40%.

Total transmittance (diffuse and specular light/radiation) of radiation from 701–1100 nm is 5–80%, preferably 10–65% or most preferably 10–45%.

Total transmittance (diffuse and specular light/radiation) of radiation from 1101–1650 nm is 5–85%, preferably 10–65% or most preferably 10–45%.

Total transmittance (diffuse and specular light/radiation) of radiation from 1651–2250 nm is 5–85%, preferably 5–60% or most preferably 10–50%.

Total transmittance (diffuse and specular light/radiation) of radiation from 2251–2500 nm is 5–85%, preferably 5–60% or most preferably 5–40%.

Total radiation (diffuse and specular radiation combined) is measured in an integrating sphere with the light source 6 degrees off the perpendicular, to the sample.

In the ranges defined the reflectance or transmission falls in between the upper and lower percentage figure, and is not outside this range for any of the wavelength thus specified.

In an especially preferred embodiment the plant treatment material is a ground cover comprising woven tapes of two different types—white and aluminium pigmented tapes.

For example the weft and warp tapes may be different. In one direction the tapes may contain 10–30% calcium carbonate, barium sulphate or magnesium oxide or mixtures of these, preferably calcium carbonate. In the other direction the tapes contain aluminium platelets as a loading of 0.5%–5%. A preferred material for constructing the ground cover of this embodiment is polypropylene and it is preferred that the tapes in both directions are mono-orientated. The aluminium platelets preferably have an average particle size in the range 10–500 microns. UV stabilisers are usefully included in these ground covers. The especially preferred particle sizes in this embodiment for the white pigments are in the range 0.3 to 3 microns. The plant treatment material of this embodiment is especially preferred for use with apples, grapes, stone fruit, kiwi fruit, persimmons and citrus.

BRIEF DESCRIPTION OF THE FIGURES

FIGS. 11 and 12 are tables of reflectance and transmittance data versus wavelength which are referred to in Example 28.

The following examples further illustrate practice of the invention.

DESCRIPTION OF THE PREFERRED EMBODIMENTS

EXAMPLES

Example 1
Woven Ground Cover with Mono-Orientation

This example used a 15% loading of calcium carbonate in 50 micron orientated polypropylene tapes that are woven into a film.

Polypropylene granules plus mineral calcium carbonate (ground to 1–10 microns) are used to prepare tapes which were subsequently elongated to mono-orientate the pigments. Before orientation mean tape width and thickness were 12 mm and 0.23 mm respectively. After stretching these values were 3.2rnm and 0.07 mm.

1. Tape and Weaving Production Details
   Machine: Lizenz, Windmuller & Holscher
   Tape Format: Warp—120 to 200—Tex with widths of 2–4 mm
   Weft—120 to 200—Tex with widths of 2–4mm
   Fabric Construction: 30 to 40 threads per dcms for warp and weft.
   Fabric Weight: 70 to 160 gms/m$^2$
2. Tape Production
   Extruder Die Temperature: 200–300° C.
   Oven Temperatures: 150° C.–180° C.
   Godet Unit Speed: 20m/min–170 m/min
   Melt Pressure: 120 to 180 kPa
   Melt Temperature: 250° C.
3. The woven tape was then coated with low density polyethylene using caste extrusion:
   Machine: Lenzing extrusion coating machine
   Preheat Setting: 150 190%
   Extruder Die Temperatures: 200° C.–300° C.
   Temperatures: 210–270° C.
   Coating Weight: 20–50 gms/m$^2$
   Final Fabric Weight: 90–210 gms/m$^2$
4. Fabrics containing barium sulphate (blanc fixe) and fabrics containing magnesium oxide may be prepared as described above for the calcium carbonate using the same pigment loading.

The ground cover reflects UV radiation, 280–400 nm and radiation from 400–800 nm.

It allows transmission, to a certain degree, of infra-red radiation 800–2500 nm and also of 2500–25000 nm.

Example 2
Woven Ground Cover with Surface Coating

A 18% loading in 50 micron orientated polypropylene tapes that are woven into a film. The pigments used are Zirconium oxide 3%

Calcium carbonate 15%

The material is then coated with a 25 micron layer by a cast extruder of polypropylene with a loading of 2% of an aluminium pigment.

This ground cover reflects IJV radiation 280–400 nm, and radiation from 400–800 nm. The radiation is made up of diffuse and specular radiation. The tapes are sealed by the coating and may require perforations to allow water and air movement through the ground cover.

The ground cover allows partial transmission of infra red radiation 800–2500 nm and also of radiation from 2500–25000 nm.

Example 3
Properties of Mono-Orientated Ground Cover

Figure 1:
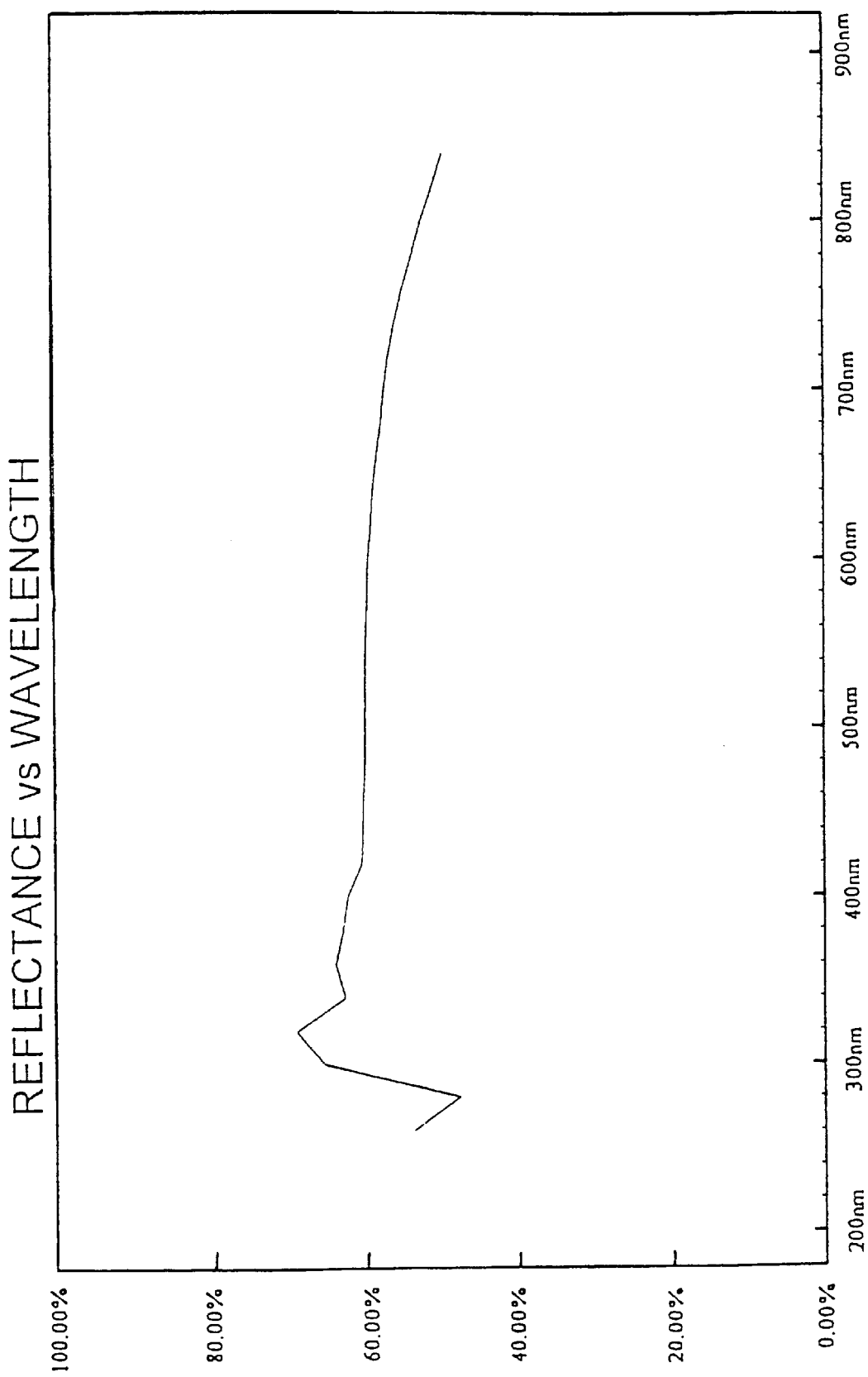
FIGS. 1, 2, 3, 4, 5, 6 and 7 are respective plots of reflectance versus wavelength for materials which are referred to in the Examples.
Figure 2:
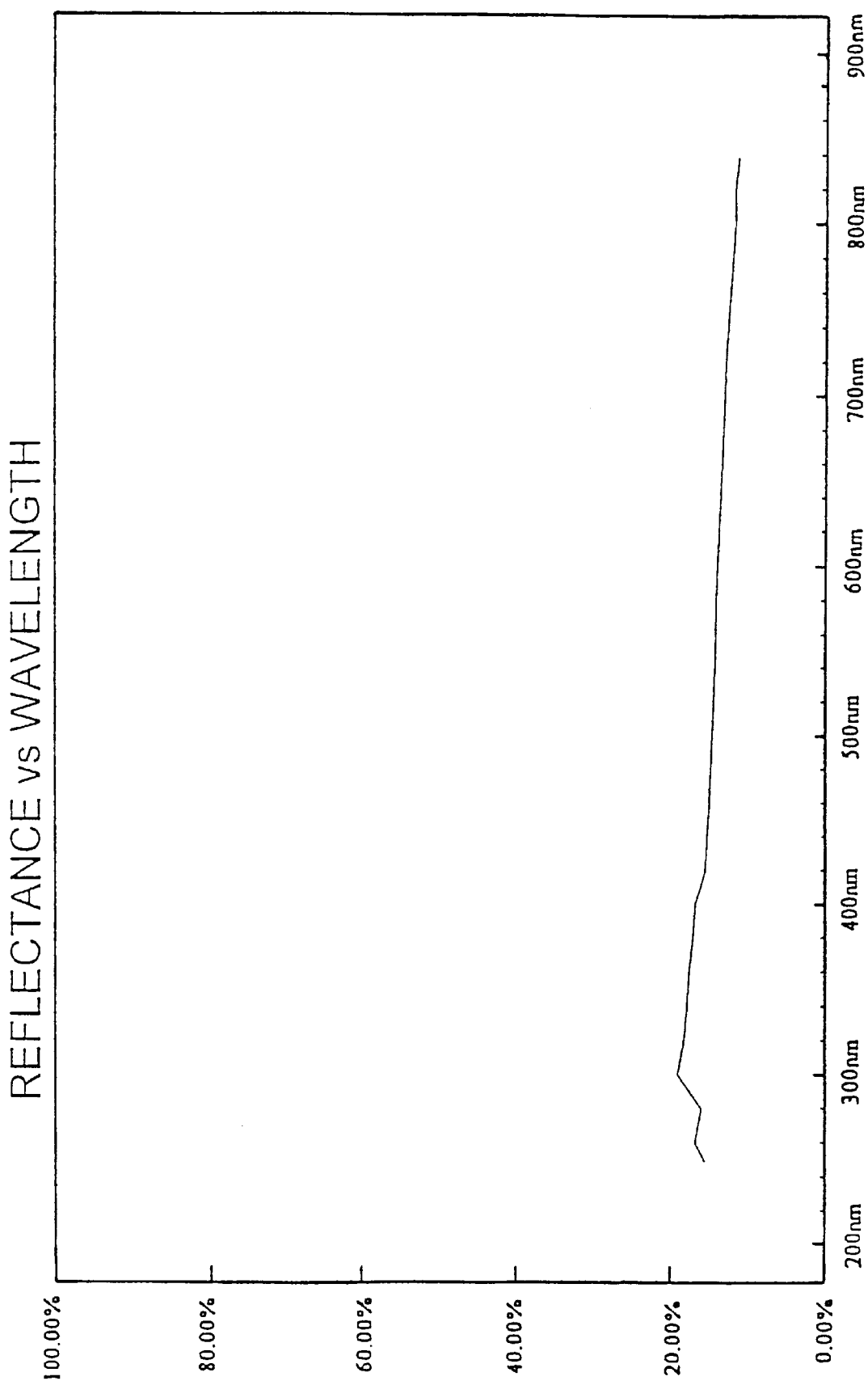

The properties of the film base before coating produced in Example 1 with Barium sulphate were measured as for System wo of Example 28. FIG. 1 shows the reflectance of the material of Example 1. FIG. 2 shows the reflectance of the same composition prepared as in Example 1. Except that the material was cast extruded. Comparison of the figures shows that reflectance is strikingly enhanced from 280–840 mm by use of mono-orientation of the polymer and pigment mixture.

Example 4
Woven Ground Cover Woven from Different Tapes

The orientated polypropylene weft tapes from Example 2 are produced with 1.5% loading of aluminium pigment instead of the white pigments. The material is woven such that the warp tapes are white tapes as from Example 2 and the weft tapes alternate between the white tapes of Example 2 and the aluminium tapes. This ground cover has reflective properties similar to Example 2 but without the coating to give improved flexibility and drape characteristics.

Example 5
Woven Ground Cover from Different Tapes plus Red Coloration

The ground cover is constructed as in example 4 but also with the addition of fluorescent dye (Macrolex Fluorescent Red G) at a concentration of 0.02%, to both the white and aluminium tapes. This ground cover has the properties of example 4 but with increased reflected red light (and decreased green light) to influence plant phytochromes.

Example 6
Woven Ground Cover Material from Different Tapes plus a Blue Coloration The ground cover material is constructed as in example 4 but also with the addition of a cobalt aluminium oxide (Lightfast Blue 100) at 0.2% concentration to both the white and aluminium tapes. This material has the properties of Example 4 but with decreased reflection of red light to influence plant phytochromes.

Example 7
Woven Ground Cover Material from Different Tapes plus a UV Absorber The ground cover material is constructed as in example 4 but with the addition of a ultra fine zinc oxide at a 0.4% concentration, to both the white and aluminium tapes. This material has the properties of example 4 but with decreased UV reflection to enable the ground cover to be used on UV sensitive plants.

Example 8
Properties of Mono-orientated Tapes

The properties of further film bases without coating were measured as for system wo of Example 28. These were prepared in a manner analogous to those of Example 1 except that the pigment composition differed. The reflectance of each is shown in FIGS. 3–7.

Figure 3:
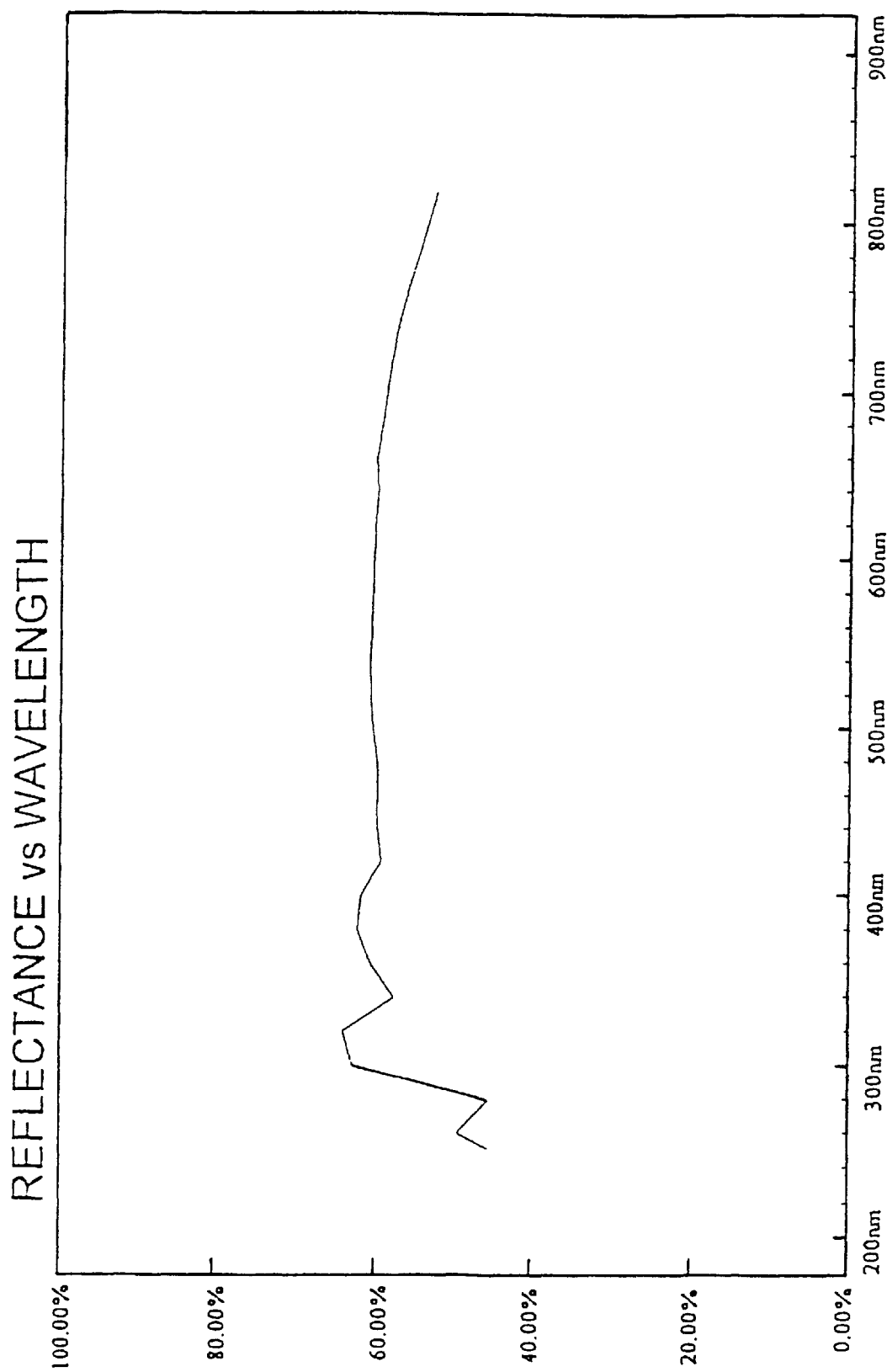
Figure 4:
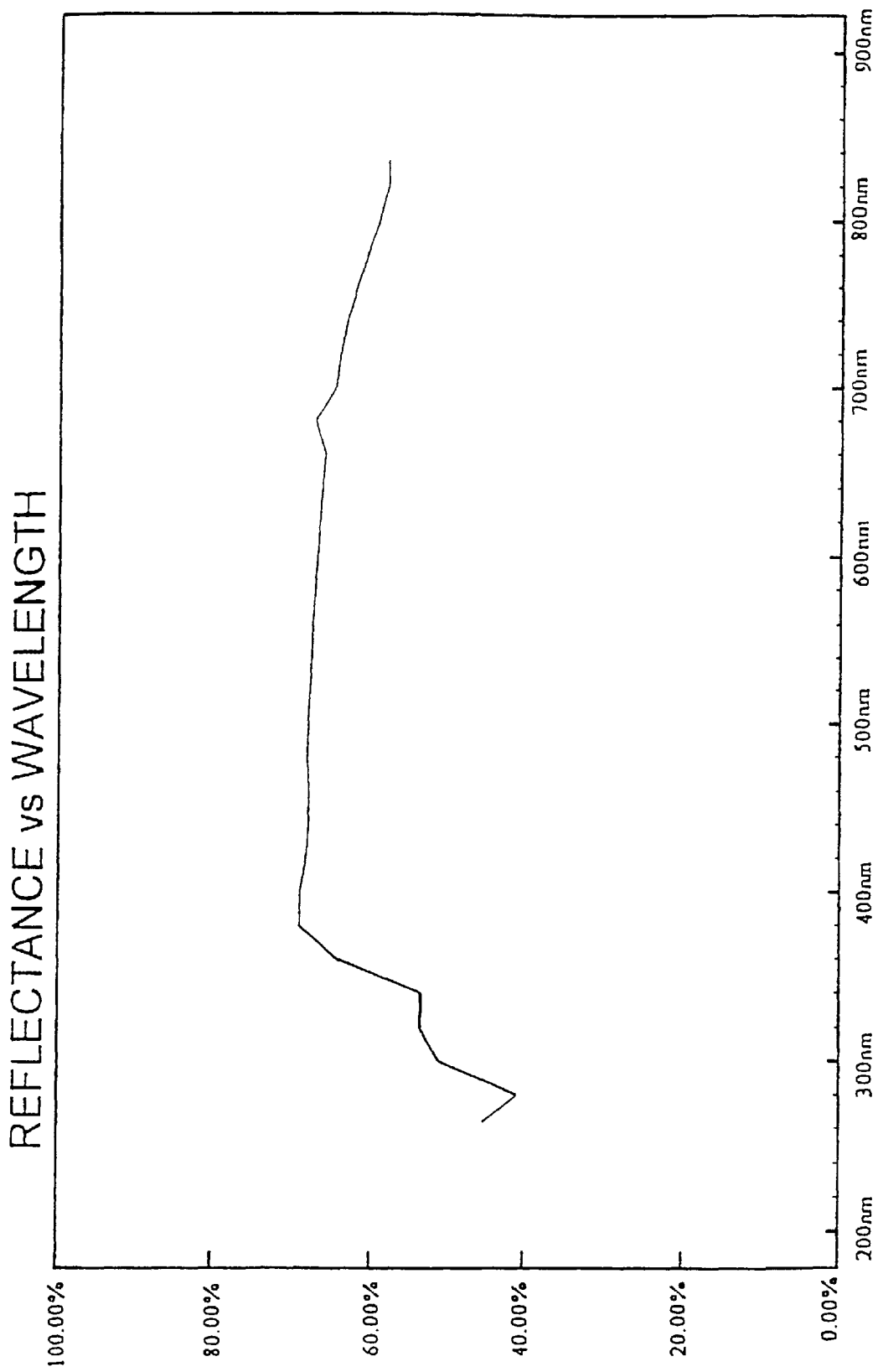
Figure 5:
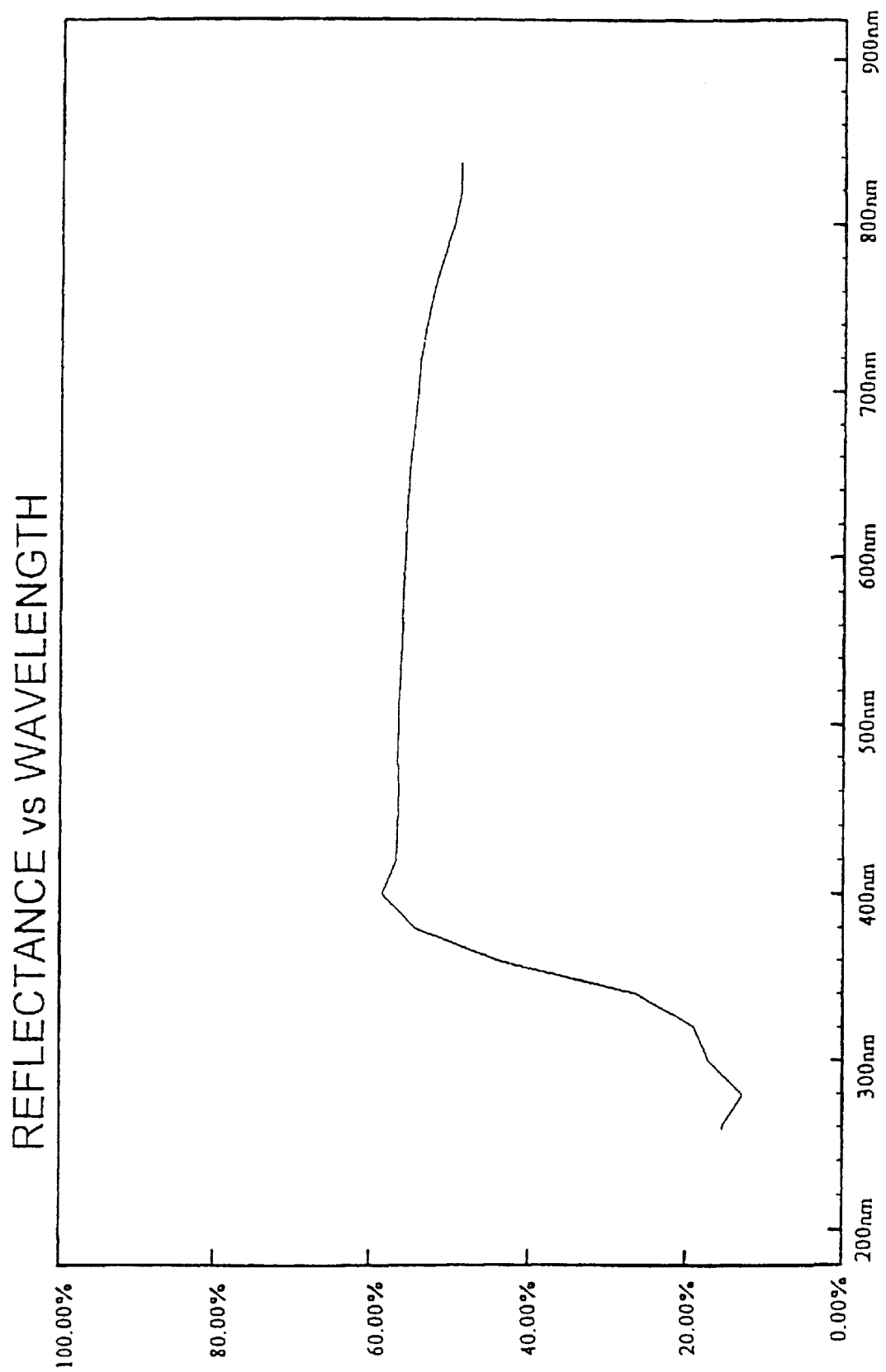
Figure 6:
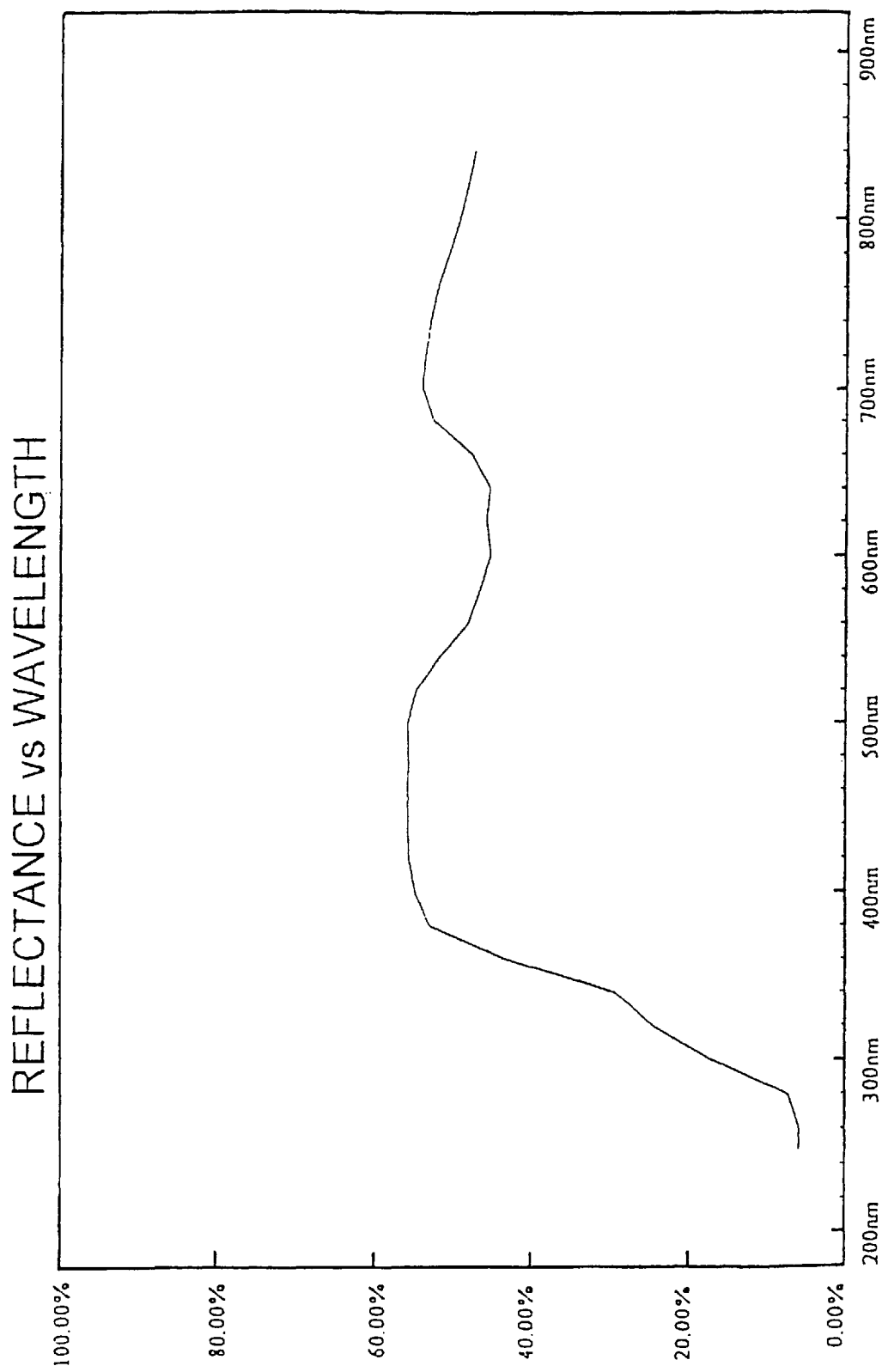
Figure 7:
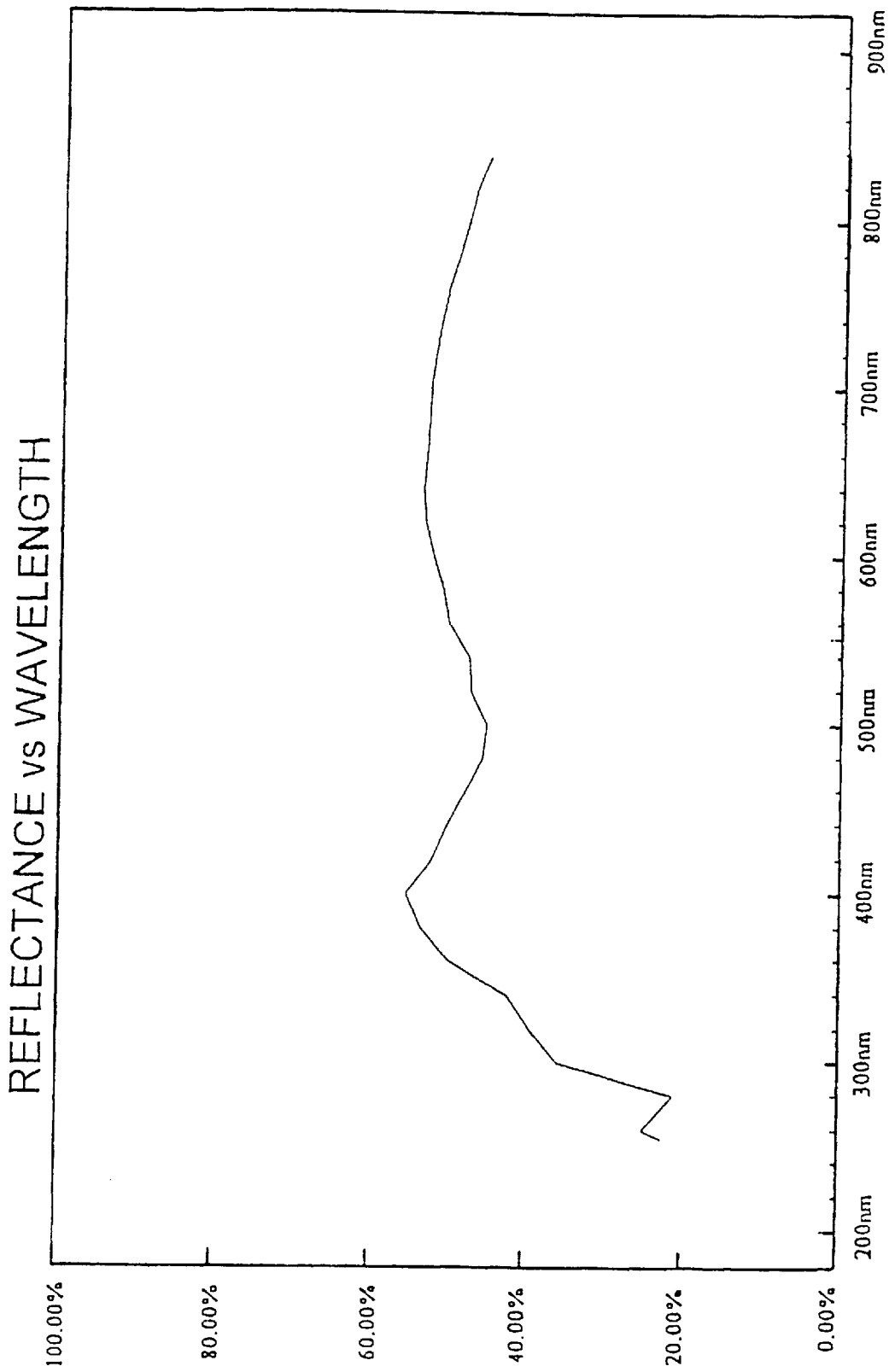

FIG. 3—Calcium carbonate mono-orientated tapes 15%
FIG. 4—Zirconium Oxide 3% plus Barium sulphate 8% oriented tapes
FIG. 5—Barium Sulphate 8%—orientated tapes plus Ultrafine Titanium dioxide at 0.4%
FIG. 6—Barium sulphate 8%—orientated tapes plus Lightfast Blue 100 at 0.2% plus Magnesium titanate 3%
FIG. 7—Barium sulphate at 8%—orientated tapes plus Macrolex Fluorescent Red G at 0.02%

Example 9

This example uses a 25% loading of calcium carbonate at an average particle size of 0.9 microns in 70 micron thick, 3.2 mm wide mono-orientated polypropylene tapes that make up the weft tapes in a fabric construction of 30 weft tapes per 10 cm. The warp tapes contain aluminium platelets with an average particle size of 70 microns at a loading of 1%. The tape thickness is 60 microns with 2.6 mm wide mono-orientated polypropylene. There are 38 warp tapes per 10 cm of fabric. Each tape has the addition of UV stabiliser at 0.35% of Tinnuvin 770 and 0.4% of Chimassorb 944.

Example 10

This example uses the addition of 30% loading of calcium carbonate with an average particle size of 1 micron in 60 micron thick polyethylene film of a width suitable for its end use. The film is blown (biaxially formed) and is mono-orientated after extrusion.

The film is then printed with aluminium platelets with an average size of 70 microns such that 0.6 grams of the aluminium platelets are applied per square metre of film. The ink is a two-pot epoxy system.

The film is UV stabilised with Chimassorb 944 at 0.2%.

Example 11

This example uses white tapes with 25% loading of calcium carbonate at an average particle size of 0.9 microns in 70 micron thick mono-orientated polypropylene tapes and separate tapes with aluminium platelets with an average particle size of 70 microns at a loading point of 1%. The aluminium tape thickness is 60 microns and is mono-orientated polypropylene. The material is then constructed with the warp made up of the above tapes, alternating the tape type, aluminium, white, aluminium white etc. This is also done for the weft tapes. Each tape has the addition of UV stabiliser at 0.35% of Tinnuvin 770 and 0.4% of Chimassorb 944.

Example 12

This example is the same as Example 9 but every 6th weft tape is made up from aluminium with an average particle size of 70 microns at a loading of 1% in polypropylene. The tape thickness is 70 microns, 3.2 mm wide and is mono-orientated.

Example 13

This example uses a 7% loading of titanium dioxide, plus 10% of calcium carbonate (with an average particle size of 0.9 micron) into polyethylene film. The film is blown, (biaxially formed), then printed with aluminium platelets, average particle size 80 microns, at an addition of 0.6 grams per square metre. The ink is a two-pot epoxy system.

Example 14

This example is the same as Example 13 but using only titanium dioxide at 12% without any addition of calcium carbonate.

Example 15

This example uses polypropylene tapes with 20% calcium carbonate (with a mean particle size of 2.7 microns) that have been mono-orientated. The tapes are used in the warp and the weft of the woven product with every 6th weft tape being made of aluminium platelets of a mean particle size of 18 microns at a 2% loading.

Example 16

As for Example 15 but without the aluminium tapes. Instead, the aluminium is placed into a coating of polypropylene cast on to the woven product at a weight of 25 grams per square metre with a 2% aluminium content. The aluminium platelets have a mean particle size of 70 microns.

Example 17 (T534)

Tapes are produced from homopolymer of propylene (grade JY630, from Montell) with addition of 15% Calcium Carbonate (grade Millicarb-OG, from Pluss-Stanfer AG).

Warp tapes are produced at 2.8 mm wide 40–60 micron thick, weft tapes at 3.2 mm wide 40–60 micron thick. Tapes are woven with construction of 38 warp tapes and 30 weft tapes per 0.1metre of the material.

Woven material is then coated with polypropylene (grade WG341C, from Borealis) at grams per square metre with the addition of 2% of Aluminium platelets (grade Silvet 460-30-E1, from Silberline).

Material is perforated with four 5 mm drilled holes every square metre of the material.

Example 18 (EU)

Tapes are produced as for Example 18 (without the coating) with the addition of 1% Calcium Zirconate average micron size 2.2 micron (grade 117, from Ferro Corporation) to the weft tapes. Also every sixth weft tape has the Calcium Carbonate replaced with 1% of Aluminium platelets (grade SS
P-950-20-C, from Silberline).

Example 19 (JJ)

Tapes are produced from homopolymer of polypropylene (grade JY630, from Montell) with the addition of 25%

Calcium Carbonate, via a polypropylene masterbatch (grade MPPNA-194, from Clariant).

Warp tapes are produced at 2.8 mm wide with a 135tex, weft tapes at 3.2 mm wide with a 195tex. Tapes are woven with a construction of 37 warp tapes and 30 weft tapes per 0.1 metre of the material.

A stabilisation system is added to the tapes.

Example 20 (JS)

Tapes are produced as for Example 19, but the warp tapes only contain Aluminium platelets at a 2% level (grade Silvet 460-30-E1, from Silberline).

Example 21 (SC)

Clear low density polyethylene film 25 micron thick is extruded without the addition of pigments or dyes and then it is printed with a two pot ink system (grade Gemini from Pacific Inks) with 24% level of Aluminium platelets (grade Silvex 460-15-D, from Silberline).

Example 22 (JTS)

Low density polyethylene film 50 micron thick produced from low density polyethylene masterbatch of Calcium Carbonate (grade MLLNA-198, from Clariant) and Titanium Dioxide as a blown film. This with some biaxial orientation.

The level of Calcium Carbonate is 20% and the Titanium Dioxide is 3.5% in the final film.

The film is then printed with a single pot ink system (grade Quasar, from Pacific Inks) with 20% level of Aluminium platelets (grade Silvex 460-15-D, from Silberline).

Example 23

Film is produced on a blown film extruder at 150 micron thick using a low density polyethylene masterbatch of Calcium Carbonate (grade MLLNA-198, from Clariant) to give a level of 25% of the pigment using a low density polyethylene resin (grade 5100, from Dow)

The film is then uniaxially orientated in the long length or machine direction of the film to reduce its thickness to 50 micron.

Material is perforated with four 5 mm drilled holes every square metre of the material.

Example 24

Film is produced on a cast film co-extruder at 200 micron thick, using a low density polyethylene masterbatch of Calcium Carbonate (grade MLLNA-198, from Clariant) for one layer (100 micron) and the other layer using Aluminium platelets (grade Silvet 460-30-E1, from Silberline)

The film is biaxially orientated to produce a film 65 micron thick.

Material is perforated with four 5 mm drilled holes every square metre of the material.

Example 25
REFLECTIVE GROUND COVER TRIALS—with Metallised Aluminium Polymer Covers Large and medium scale trials were conducted at a number of sites in 1995 and 1996 in Hawkes Bay, New Zealand, to evaluate the potential response of ground covers to increase fruit production using prior art Soltec foil reflective (Paper Coaters, NZ) ground covers. The results are shown in Table 3.

TABLE 3

TRIAL DETAILS AND RESULTS

| Location | A | B | B | C | D |
| --- | --- | --- | --- | --- | --- |
| Apple Variety | Gala | Fuji | Pink Lady | Gala | Sunrise |
| Rootstock | MM106 | MM793 | MM26 | MM793 | MM106 |
| Year Planted | 1976 | 1987 | 191 | 1989 | 1995 |
| Row Spacing | 5.2 m | 5.4 m | 4.5 m | 4.5 m | 4.0 m |
| Tree Spacing | 3.3 m | 3.3 m | 1.8 m | 2.5 m | 2.0 m |
| Row Orientation | North–South | West–East | North–South | North–South | North–South |
| Cover Applied | 26 Nov 1995 | 27 Nov 1995 | 27 Nov 1995 | 26 Nov 1995 | 25 Nov 1996 |
| Cover Width (each side of trees) | 1.05 m | 1.05 m | 0.75 m | 1.05 m | 1.05 m |
| No Trees Treated | 84 | 48 | 140 | 424 | 260 |
| No Control Trees | 85 | 52 | 92 | 60 | 265 |
| Full Bloom | 26 Oct | 23 Oct | 28 Oct | 25 Oct | 23 Oct |
| Average Fruit Size (g) | | | | | |
| Treated Trees | 153.0 | 209.0 | 211.4 | 143.0 | — |
| Control Trees | 161.0 | 198.0 | 191.4 | 155.0 | — |
| Total Fruit Harvested (kg) | | | | | |
| Treated Trees | — | — | — | — | 7318 |
| Control Trees | — | — | — | — | 6650 |
| Percent Increase in Production or Fruit Size | 6.6 | 5.6 | 10.5 | 7.7 | 10.1 |

The increase in fruit size was measured from pack house data (the packhouse supplied the average fruit weight from the control and treated harvested trees which were graded separately) with the exception of the Gala trials located at Sites A and C which were measured from fruit size samples at harvest. The Sunrise fruit size was not measured directly but the trees were harvested and the total weight of fruit harvested was recorded for each treatment. All data was measured and supplied by the grower's packhouse or the grower directly.

The trend was indicating that an application of metallised aluminium reflective ground cover in late November (30–40 days after full bloom) is giving a 5–10% increase in production. Blush colour was also improved to a varying degree at each site, up to a maximum amount as for the comparative reflective ground cover trial in Gisborne, New Zealand on Royal Gala.

Application before late November was not useful. When tested there were problems with the metallised aluminium ground covers suppressing soil warming. This may have been the cause of the collapse of the young spring growth. It may also have been due to direct light. In late November mean soil temperatures is at 17° C. at 0.1 m, with 2° C. suppression from the aluminium covers this results in a mean of 15° C. which is considered a minimum temperature for good plant root activity.

Example 26

COMPARATIVE REFLECTIVE GROUND COVER TRIAL

Background

Trial established on apple, Royal Gala variety on MM106 rootstock, planted with rows running North-South. Trees planted in 1991 at 5 metre row spacing with 3 metres between trees. Tree trained as centre leader type tree with axis pruning system.

Reflective ground covers were applied on Jan. 1, 1997 as 1 metre wide covers on each side of the trees. The covers were placed on to two adjoining rows with 8 trees in each row to give 16 trees in total for each replication. There were two replications per treatment.

Each set of replications was adjacent in the row direction in the following pattern down the row.

| | |
|---|---|
| Control | Replication One |
| SS | Replication One |
| T534 | Replication One |
| Control | Replication Two |
| SS | Replication Two |
| T534 | Replication Two |

Treatments were
1 Control - (No cover, herbicide strip)
2 SS - Metallised aluminium polymer ground cover of the prior art.
3 T534 - Oriented weave of polypropylene/Calcium Carbonate coated with polymer/aluminium platelets of Example 17.

Harvest occurred on the two adjacent rows of each replication of each treatment such that fruit was weighed at each of the 5 harvests. Fruit was picked on the basis that it had at least a minimum of 66% blush colour.

After the trail harvest pick on Mar.7, 1997 the remaining fruit on the trees that failed to reach 66% blush colour was harvested to determine the unharvested fruit. This plus harvested fruit gave total yield per treatment.

The results are shown in Tables 4 and 5. A higher proportion of the crop is ready for harvest at an early date when T534 ground covers are used

TABLE 4

| | Kg Fruit Harvested | | |
|---|---|---|---|
| | | Treatment | |
| Harvest Date | Control | SS | T534 |
| 6 February 1997 | 116.5 | 106.0 | 100.3 |
| 13 February 1997 | 83.1 | 130.3 | 188.9 |
| 22 February 1997 | 712.6 | 886.6 | 1163.0 |
| 3 March 1997 | 1298.8 | 1389.6 | 1240.5 |

TABLE 4-continued

| | Kg Fruit Harvested | | |
|---|---|---|---|
| | | Treatment | |
| Harvest Date | Control | SS | T534 |
| 7 March 1997 | 799.1 | 514.2 | 454.1 |
| Total Harvest | 3010.1 | 3026.7 | 3146.8 |

TABLE 5

| | Percentage of Fruit Harvested at Each Harvest Date | | |
|---|---|---|---|
| | | Treatment | |
| Harvest Date | Control | SS | T534 |
| 6 Feb 97 | 3.2 | 3.2 | 2.9 |
| 13 Feb 97 | 2.3 | 3.9 | 5.5 |
| 22 Feb 97 | 19.8 | 26.7 | 33.8 |
| 3 March 97 | 36.0 | 41.9 | 36.0 |
| 7 March 97 | 22.1 | 15.5 | 13.2 |
| Total Harvest | 83.4 | 91.2 | 91.4 |
| Unharvested | 16.6 | 8.8 | 8.6 |
| Total Yield | 100.0 | 100.0 | 100.0 |

The results show the benefit from using the metallised aluminium polymer ground cover to assist fruit colour. This results is consistent with other trials.

The T534 is an example of the invention and is able to produce a similar, if not slightly better colour development than the SS material.

The SS material with its higher total reflectivity would have perhaps been expected to be better that T534 but this is not the case. The reason may relate to the fact that T534 reflects greater amounts of the very short wavelengths and/or its reflective pattern of the diffuse and direct light gives a superior reflected light pattern for fruit blush colour development.

The T534 model that allows soil warming gives the advantage that it can be applied in early spring while the SS material would not be able to be applied in early spring without causing problems of collapse of the young shoots or the suppression of growth, due to its soil warming restriction properties and/or the type of reflected light.

Example 27

REFLECTIVE GROUND COVER TRIAL 1997

Background

With Example 26 demonstrating successful colour development, the material was then ready to be tested with application at the end of flowering. Material used for this trial was EU (see Example 18)

To obtain two sets of data in one year a trial was established in South Tirol in northern Italy, on Mondial Gala (a strain of Royal Gala) apples.

The trees were on MM9 rootstock, 3 m between rows and 0.75 m between trees. The material was 0.75 m wide placed on each side of the trees on the 23 April 1997, after the completion of petal fall, 15 days after full bloom. There were 4 replications for the 2 treatments (reflective cover and no cover). With a total of 53 trees in the control or no cover treatment and 51 trees in the trees with the reflective cover. The results are shown in Table 6.

TABLE 6

Results of Reflective Ground Cover Trial in Italy

| Treatment | Replication | Total Weight (g) | No of trees | Weight per tree (g) | Mean fruit weight (g) | Percentage of fruit 70% or more blush colour | Percentage of fruit surface with yellow and red colour | Percentage of fruit surface with green colour | Total No of apples |
|---|---|---|---|---|---|---|---|---|---|
| Control | Mean | 705292 | 53 | 13307 | 156.5 | 58.9 | 93.5 | 7.0 | 4510 |
| Cover | Mean | 832343 | 51 | 16320 | 164.3 | 69.0 | 95.5 | 5.0 | 5074 |

Fruit Diameter

| Treatment | Replication | % <65 mm | % 65 mm+ | % 70 mm+ | % 75 mm+ | % 80 mm+ | % 85 mm+ | % 90 mm+ |
|---|---|---|---|---|---|---|---|---|
| Control | Mean | 6.6 | 34.5 | 26.8 | 24.7 | 5.2 | 1.7 | 0.5 |
| Cover | Mean | 4.2 | 26.7 | 29.3 | 29.2 | 7.4 | 2.3 | 0.9 |

Colour Data

| Treatment | Replication | % Ground Colour | % Red | % Dark Red | >60% Blush Colour | >80% Blush Colour |
|---|---|---|---|---|---|---|
| Control | Mean | 32.5 | 39.0 | 28.5 | 77.8 | 48.7 |
| Cover | Mean | 27.8 | 38.5 | 33.8 | 85.2 | 61.1 |

The typical production for Royal Gala in this part of Italy is around 55 tonnes per canopy hectare. In this year of 1997 the control yielded 59.1 tonnes per canopy hectare while the treated trees were able to yield 72.5 tonnes per canopy hectare. This 22.6% increase in production is significantly greater than the 5–10% achieved with application of reflective covers at day 30–40 after full bloom.

This increase is considered to be due to the ability to be able to apply the reflective cover 15 days after full bloom rather than 30–40 days after full bloom. Also the different type of light from the new art with its particular pattern and type of direct and diffuse light may be giving this superior result.

The new reflective cover is able to allow soil warming or to not restrict soil warming to occur in addition to the increase in reflective light. The reflective properties of the cover with a combination of direct and diffuse reflected light also demonstrated in this trial its ability to increase fruit blush colour development.

Example 28
RADIATION MEASUREMENT SYSTEMS
System One—Reflectance and Transmittance 280–2500 nm
  Monochromator System The high accuracy spectrophotometer system is based around a 1 m focal length Czerny Turner monochromator. The monochromatic light output from the monochromator is then collimated and directed by mirrors to various measurement setups. This system will operate over the wavelength range of approximately 200 nm to 2500 nm and the bandwidth is variable up to 3 nm.

Diffuse Reflectance

The diffuse reflectance was measured using an integrating sphere with the sample port tilted by 60 to the incident light so that the specular reflected light as well as diffuse reflected light off the sample is included in the measurement. The sphere surface is coated with pressed halon powder and has an internal diameter of 7 cm. The entrance and sample port diameters are 1 cm. The detectors used are a silicon photo-diode over the wavelength range 280 nm to 1100 nm and a lead sulphide detector over the wavelength range 800 nm to 2500 nm. The monochromatic light was focused onto the sample using an off axis parabolic mirror of focal length 35 cm, f/15.

Four samples are mounted on a pneumatic driven sample changer along with a halon white reference sample and a black cone.

The samples were measured using an integrating sphere with the sample at 6° to the incident light so that specular as well as diffuse reflected light was measured. The incident light beam onto the sample filled an area 5 mm×4 mm and for the woven samples was centred at the intersection of two warp and two weft strips of the weave. The light beam had a bandwidth of 2.4 nm.

Diffuse Transmittance

The diffuse spectral transmittance was measured using an integrating sphere with the sample port normal to the incident light. The sphere wall is coated with pressed halon powder and has an internal diameter of 18 cm and the sample port is 4 cm diameter. The sample is mounted to cover half the sample port of the sphere and is near the focal point of the light from the monochromator. The sphere and sample are translated across the light beam so the light either enters the sphere unimpeded or is transmitted through the sample into the sphere. This setup corrects for the effect of the sample being part of the sphere wall.

The detectors are the same as used for the diffuse reflectance setup.

The samples were mounted at the entrance port of an integrating sphere and normal to the incident light beam which had a bandwidth of 2.4 nm. The illuminated area at the sample was 7 mm×5 mm.

The spectral diffuse transmittance of the SS sample at wavelengths greater than 1200 nm was too low for reliable measurements. The spectral diffuse transmittance off the MET sample at wavelengths greater than 2000 nm was too low for reliable measurements.

Conditions

These measurements were made at a room temperature of 20° C.±0.5° C.

In each case, an area of the sample to be tested was chosen which visually appeared to be representative of the sample as a whole. The uncertainty at the 95% confidence level in the values of diffuse reflectance, and diffuse transmittance is ±10% of the value or ±0.01, whichever is the greater.

System Two—Transmittance/Reflectance 280–840 nm
  Measurement is made with a:
  Varian Techtron
  Model 6345 UV-Visible Spectrophotometer
  Diffuse reflectance accessory and halon white reflectance standard.
  Readings taken every 20 nm between 280–840 nm 840–420 nm visible lamp is used 400–280 nm only UV lamp is used Beam width is 2 nm For the transmittance measurement both reflectance standards are left in place. Scan is made first with no sample in holder, then scan with the sample in place. Sample placed into holder in front of the integrating sphere.

For reflectance measurement the instrument is zeroed and then one reflectance standard is removed and replaced with a black light trap. Scan is made with this arrangement, then scan is made with the sample in front of the light trap.

Instrument is zeroed at the following wavelengths for the range of wavelengths in brackets.

840 nm (780–840 nm)

700 nm (740–660 nm)

600 nm (640–560 nm)

500 nm (540–460 nm)

380 nm (440–280 nm)

System Three—Transmittance 2500–20000 nm

The infra red measurements were made with a BOMEN DA8 Fourier Transform Infared spectrophotometer (FTIR) in the 2.5 mm to 22 mm region. Between 2.5 mm and 4 mm, the FTIR was fitted with a Quartz-Halogen source, a $CaF_2$ beam-splitter and an InSb detector. In the region from 4 mm to 22 mm, a Globar source was used together with a KBr beam-splitter and an MCT (Mercury Cadmium Telluride) detector.

All measurements were made in vacuum with a spot size of 1 mm. The transmitted beam was captured and fed into the detector by a mirror of diameter 50 mm and focal length 75 mm (f/1.5). The incidence angles for the transmittance were kept as close as possible to normal incidence. The transmittance was measured at an off-normal angle of less than 8°.

System Four—Transmittance 2500–20000 nm

Measurement is made with a:

Biorad

FTIR—Fourier Transform Infra Red Spectrophotometer Model FTS-7

Dector DTG5

Sample beam aperture 25 mm diameter

This is a single light beam system where the machine records measurements of no sample, then the sample to cover the 25 mm diameter aperture is placed into the machine, measured and the transmittance is measured.

All the data from systems one to four may be presented as a proportion of 1 (i.e. 0.5 reflectance equals 50% reflectance).

Example 29

REFLECTANCE AND TRANSMITTANCE DATA

| Material | Description |
|---|---|
| Prior Art | |
| W | White Titanium polyolefin cover film |
| WW | White Titanium Dioxide polyolefin cover |
| TX | White unpigmented polyolefin cover (Tyvex) |
| SS | Metallised Aluminium on polymer laminated to polyolefin weave (Soltec foil reflective) |
| MET | Metallised Aluminium with polyolefin film backing (Colorup) |
| Invention | |
| T534 | Polyolefin weave from Calcium Carbonate/polymer orientated then coated with polyolefin polymer and Aluminium platelets (Example - 17) |
| EU | Polyolefin weave from Calcium Carbonate/polymer orientated with every 6th weft tape pigmented Aluminium platelets (Example - 18) |
| JS | Polyolefin weave from Calcium Carbonate/polymer orientated for the weft tapes and Aluminium platelets/polymer orientated for the warp tapes (Example - 20) |
| JJ | Polyolefin weave from Calcium Carbonate/polymer orientated (Example - 19) |
| JTS | Polyolefin film from Calcium Carbonate and Titanium Dioxide with Aluminium platelets printed on to the surface (Example - 22) |
| SC | Aluminium platelets printed on to clear polyolefin film (Example - 21) |
| JSS | Polyolefin weave from aluminium platelet/polymer orientated for use in warp and or weft tapes (e.g JS). |

TABLE 7

REFLECTANCE AND TRANSMITTANCE DATA

Figure 13:
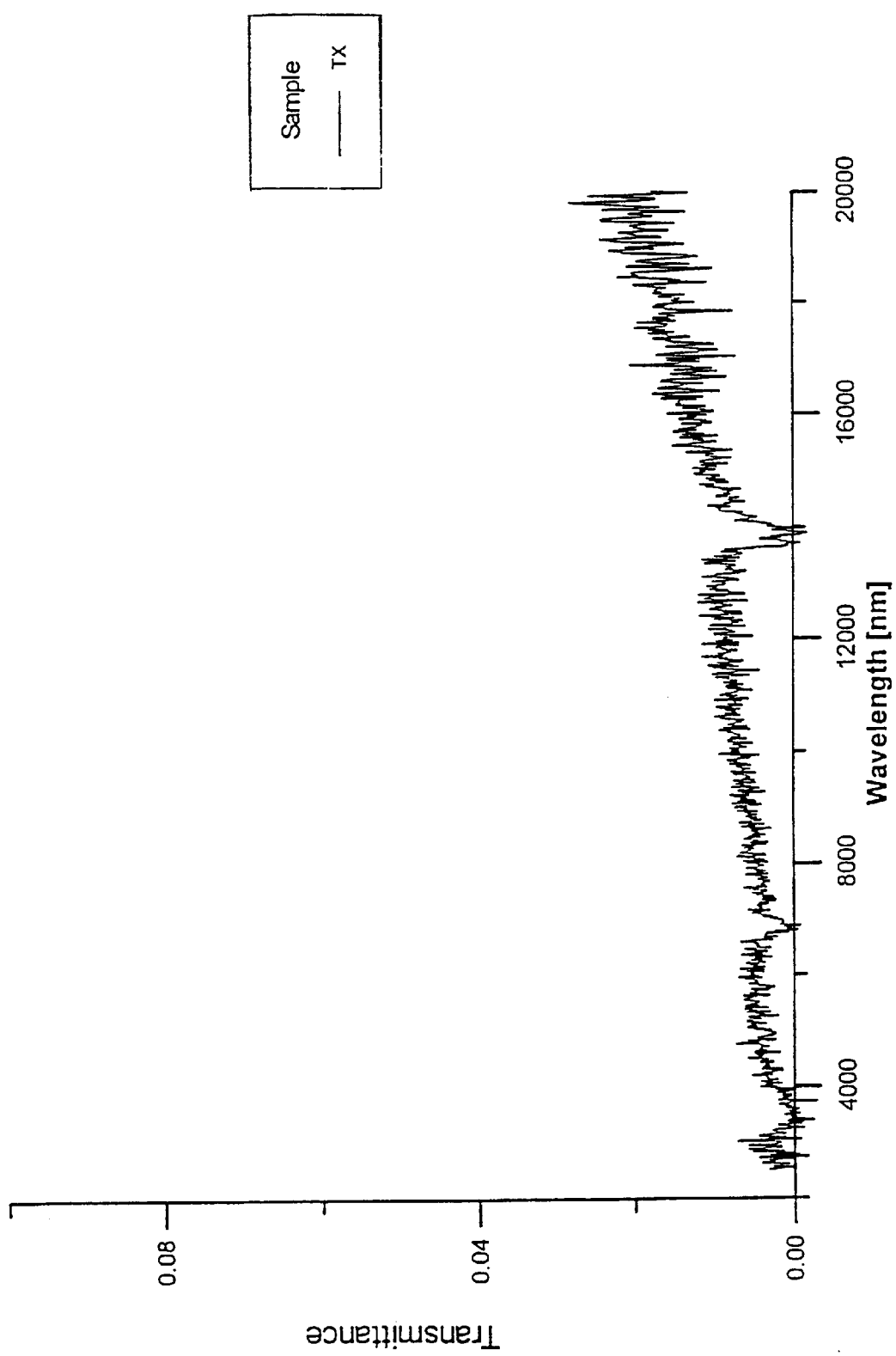
Figure 14:
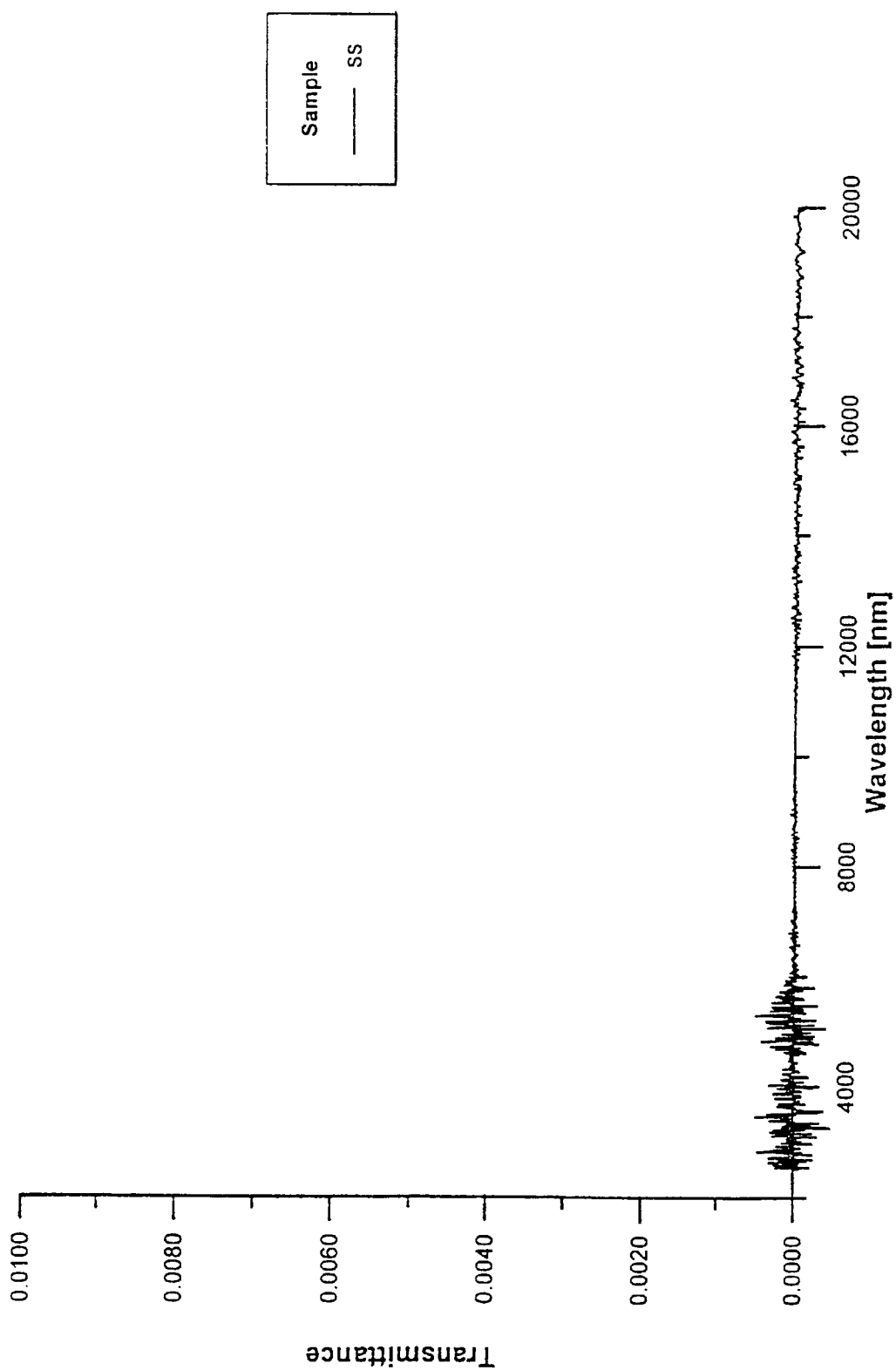
Figure 15:
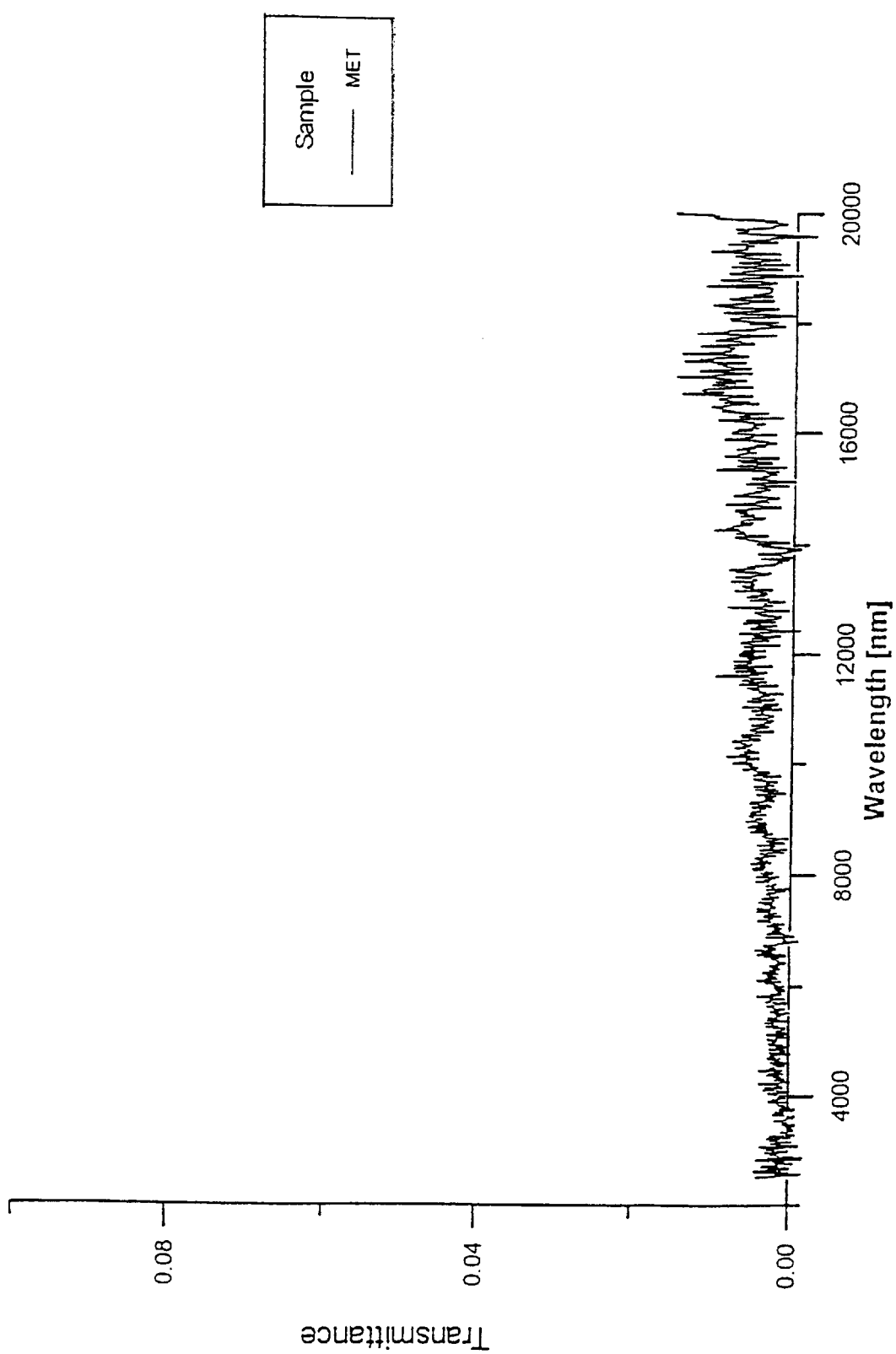
Figure 16:
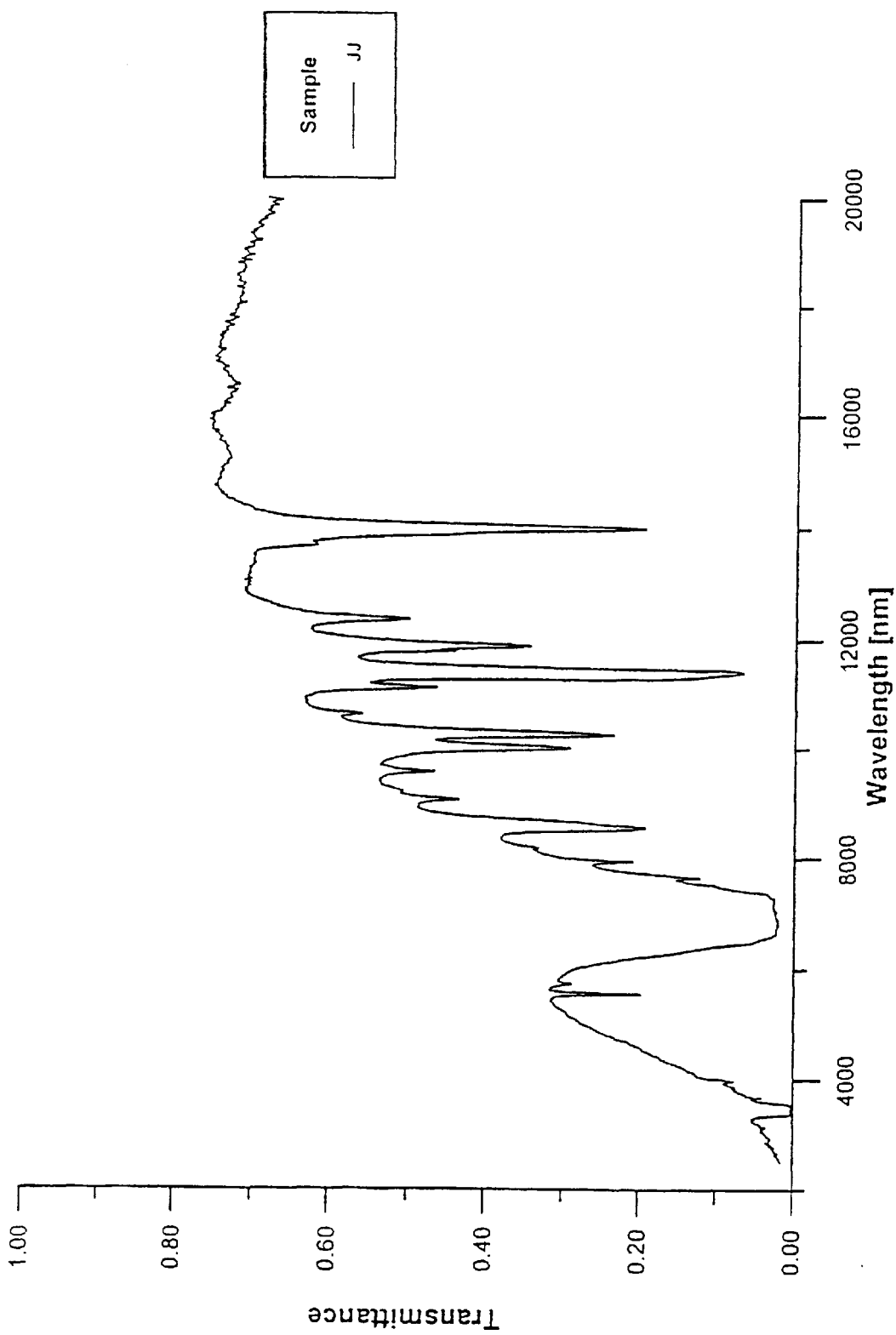
Figure 17:
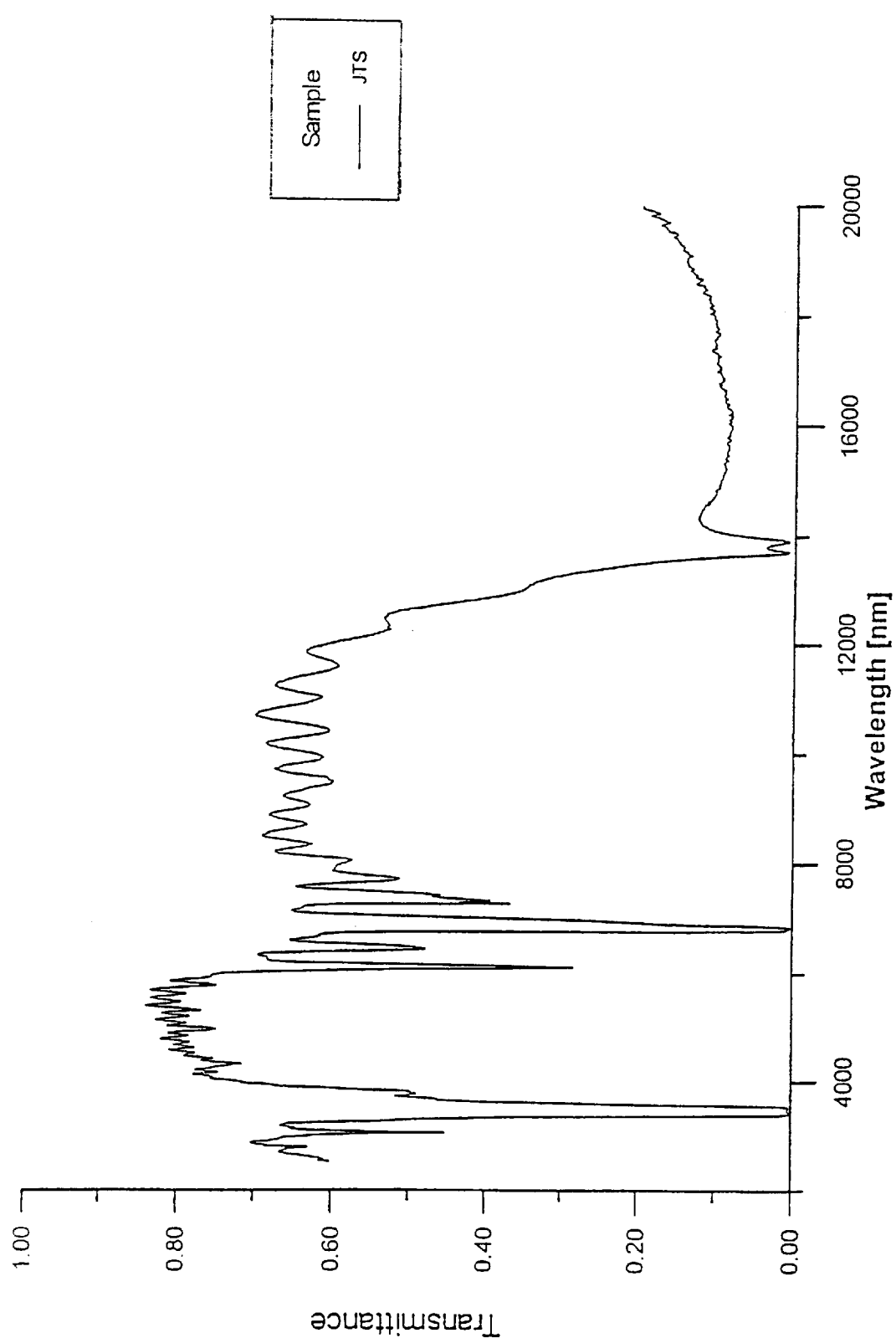
Figure 18:
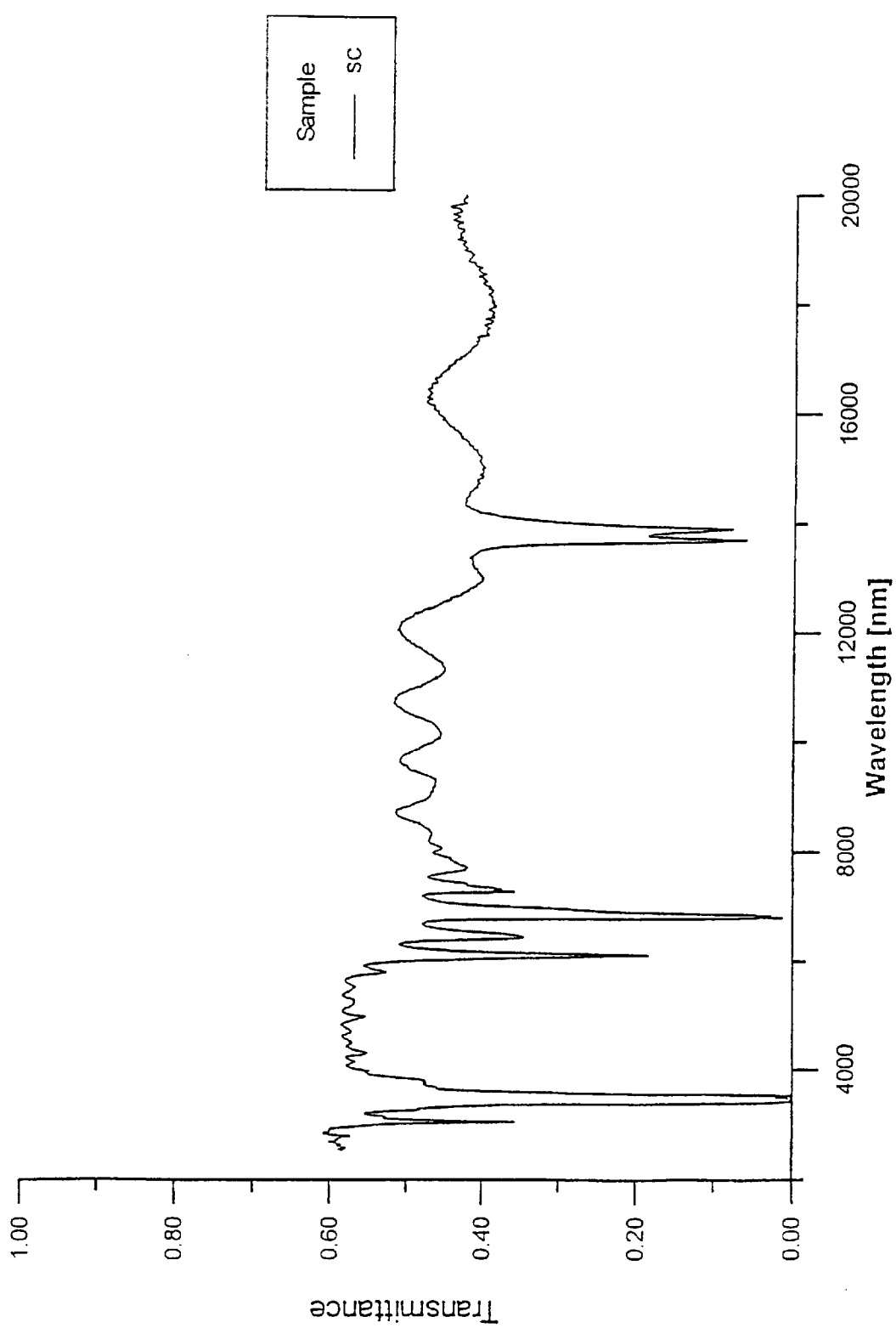

| Measurement System (see Example 28) Wavelength Material | One Reflectance 280– 2500 nm | Two Reflectance & Transmittance 280–840 nm | One Transmittance 280– 2500 nm | Three Transmittance 4100– 10100 nm | Four Transmittance 400– 6250 nm |
|---|---|---|---|---|---|
| WW | FIG. 11 | — | FIG. 12 | — | — |
| TX | FIG. 11 | — | FIG. 12 | FIG. 13 | — |
| SS | FIG. 11 | Table 8 | FIG. 12 | FIG. 14 | Table 9 |
| MET | FIG. 11 | — | FIG. 12 | FIG. 15 | — |
| JS | FIG. 11 | — | FIG. 12 | — | — |
| JJ | FIG. 11 | — | FIG. 12 | FIG. 16 | — |
| JTS | FIG. 11 | — | FIG. 12 | FIG. 17 | — |
| SC | FIG. 11 | — | FIG. 12 | FIG. 18 | — |
| T534 | — | Table 8 | — | — | Table 9 |

TABLE 7-continued

REFLECTANCE AND TRANSMITTANCE DATA

Figure 19:
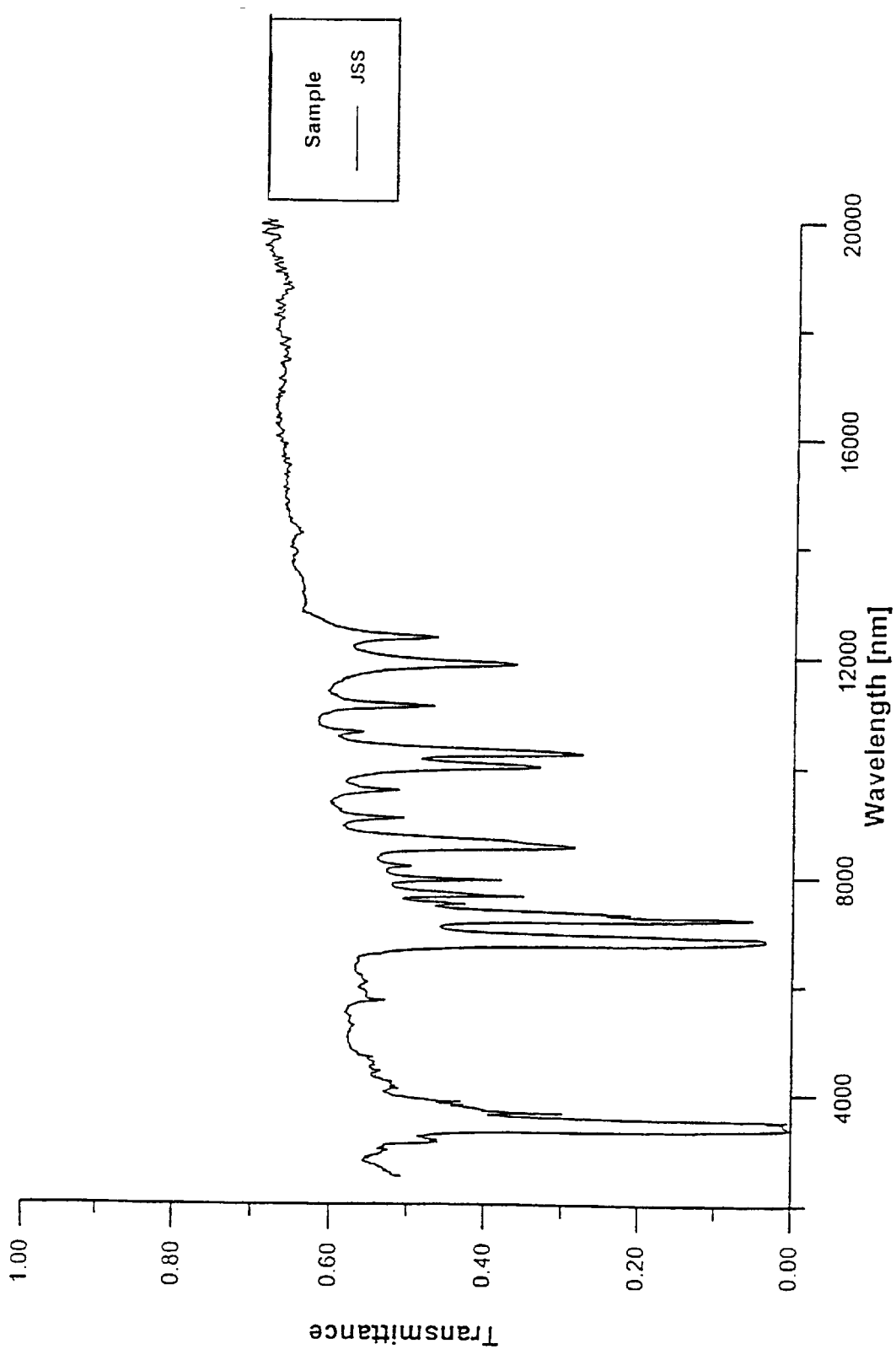

| Measurement System (see Example 28) Wavelength Material | One Reflectance 280– 2500 nm | Two Reflectance & Transmittance 280–840 nm | One Transmittance 280– 2500 nm | Three Transmittance 4100– 10100 nm | Four Transmittance 400– 6250 nm |
|---|---|---|---|---|---|
| EU | — | Table 8 | — | — | Table 9 |
| JSS | — | — | — | FIG. 19 | — |

Figure 8:
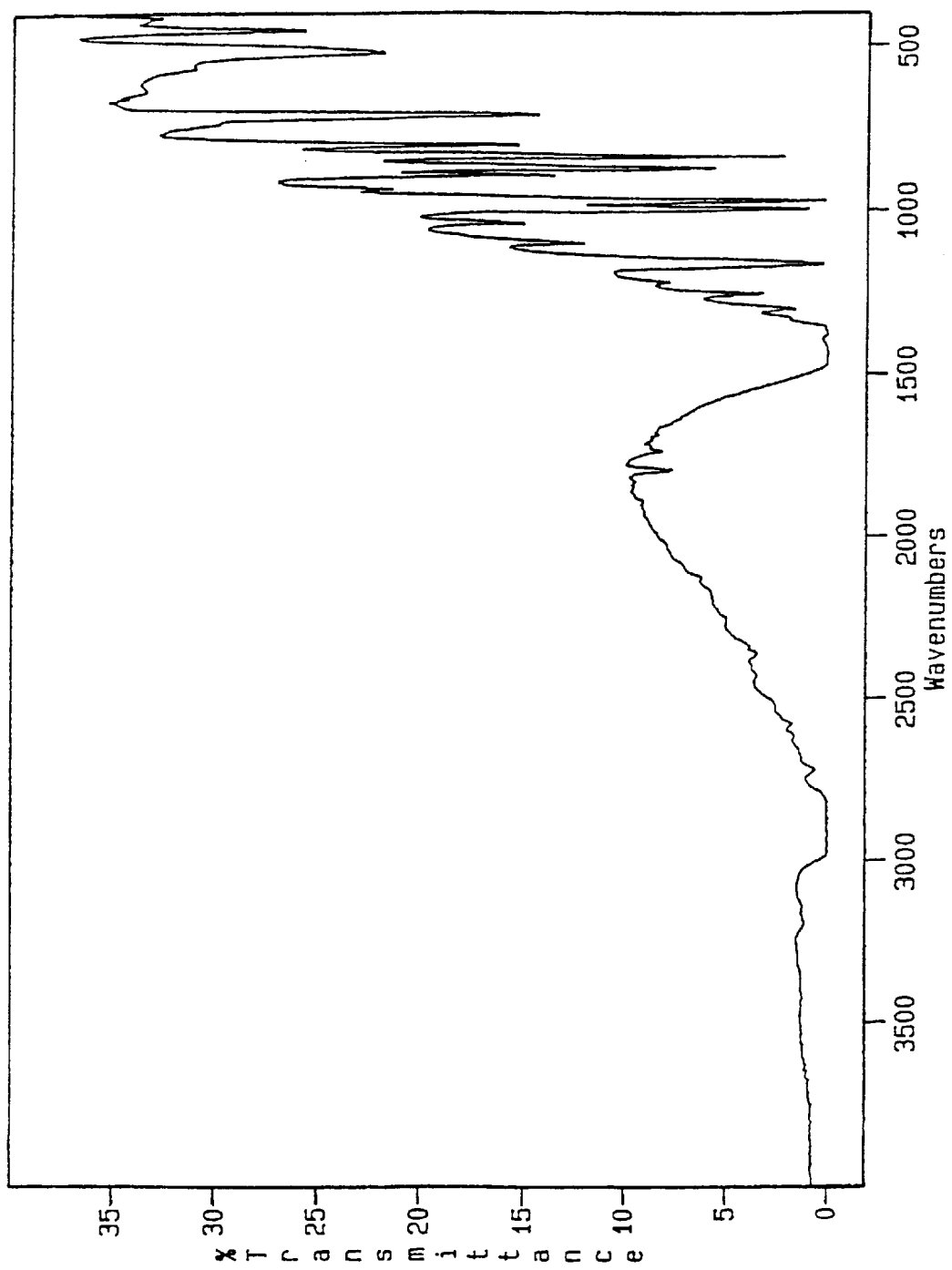
FIGS. 8, 9, 10, 13, 14, 15, 16, 17, 18 and 19 are respective plots of transmittance versus wavelength for materials referred to in the Examples.
Figure 9:
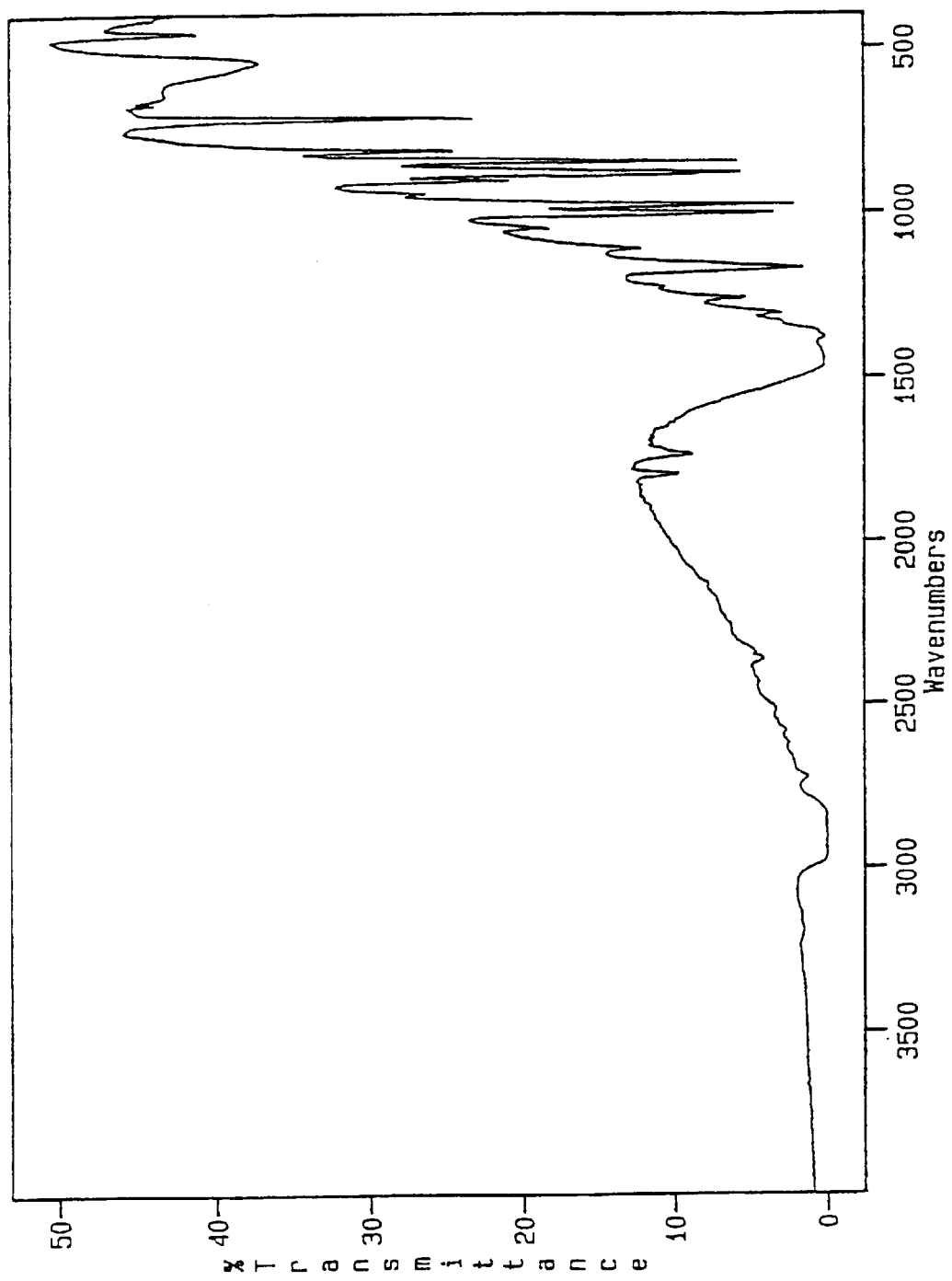
Figure 10:
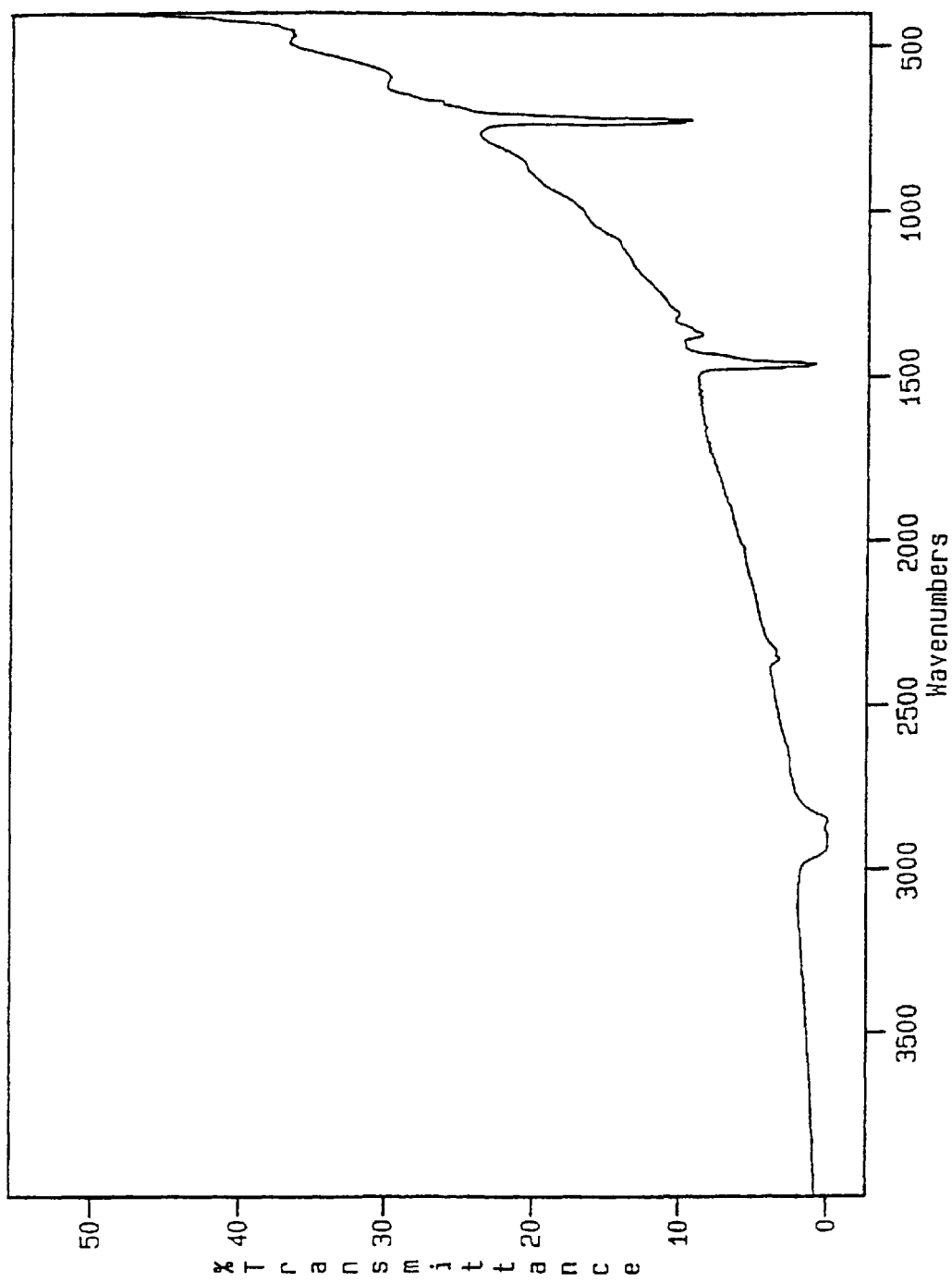

FIGS. 8, 9 and 10 respectively show transmittance data for T534, EU and carbon black pigmented polyolefin film respectively.

TABLE 8

Percentage Transmission and Reflectance 280–840 nm - measured as for System Two

| Wavelength | Transmission Sample | | | Reflectance Sample | | |
|---|---|---|---|---|---|---|
| nm | SS | T534 | EU | SS | T534 | EU |
| 840 | 3.00E−02 | 3.90E−01 | 3.99E−01 | 6.62E−01 | 5.02E−01 | 4.89E−01 |
| 820 | 1.20E−02 | 3.68E−01 | 3.80E−01 | 6.86E−01 | 5.06E−01 | 4.93E−01 |
| 800 | 9.00E−03 | 3.68E−01 | 3.78E−01 | 6.86E−01 | 5.20E−01 | 5.04E−01 |
| 780 | 8.00E−03 | 3.69E−01 | 3.80E−01 | 7.09E−01 | 5.37E−01 | 5.18E−01 |
| 760 | 7.00E−03 | 3.71E−01 | 3.81E−01 | 7.32E−01 | 5.54E−01 | 5.30E−01 |
| 740 | 5.00E−03 | 3.52E−01 | 3.42E−01 | 7.34E−01 | 5.38E−01 | 5.44E−01 |
| 720 | 6.00E−03 | 3.53E−01 | 3.41E−01 | 7.48E−01 | 5.49E−01 | 5.51E−01 |
| 700 | 5.00E−03 | 3.53E−01 | 3.39E−01 | 7.57E−01 | 5.57E−01 | 5.55E−01 |
| 680 | 5.00E−03 | 3.51E−01 | 3.37E−01 | 7.65E−01 | 5.62E−01 | 5.60E−01 |
| 660 | 4.00E−03 | 3.51E−01 | 3.34E−01 | 7.73E−01 | 5.67E−01 | 5.63E−01 |
| 640 | 5.00E−03 | 3.43E−01 | 3.35E−01 | 7.54E−01 | 5.65E−01 | 5.51E−01 |
| 620 | 5.00E−03 | 3.41E−01 | 3.33E−01 | 7.58E−01 | 5.68E−01 | 5.52E−01 |
| 600 | 5.00E−03 | 3.39E−01 | 3.31E−01 | 7.61E−01 | 5.72E−01 | 5.53E−01 |
| 580 | 5.00E−03 | 3.36E−01 | 3.29E−01 | 7.62E−01 | 5.74E−01 | 5.53E−01 |
| 560 | 5.00E−03 | 3.33E−01 | 3.26E−01 | 7.63E−01 | 5.77E−01 | 5.53E−01 |
| 540 | 5.00E−03 | 3.24E−01 | 3.09E−01 | 7.97E−01 | 5.78E−01 | 5.68E−01 |
| 520 | 6.00E−03 | 3.21E−01 | 3.05E−01 | 7.96E−01 | 5.80E−01 | 5.68E−01 |
| 500 | 6.00E−03 | 3.19E−01 | 3.02E−01 | 7.95E−01 | 5.83E−01 | 5.69E−01 |
| 480 | 6.00E−03 | 3.12E−01 | 2.99E−01 | 7.91E−01 | 5.84E−01 | 5.65E−01 |
| 460 | 7.00E−03 | 3.07E−01 | 2.93E−01 | 7.92E−01 | 5.88E−01 | 5.65E−01 |
| 440 | 7.00E−03 | 2.83E−01 | 2.89E−01 | 7.52E−01 | 5.59E−01 | 5.58E−01 |
| 420 | 8.00E−03 | 2.77E−01 | 2.84E−01 | 7.50E−01 | 5.62E−01 | 5.60E−01 |
| 400 | 7.00E−03 | 2.79E−01 | 2.73E−01 | 7.56E−01 | 5.70E−01 | 5.72E−01 |
| 380 | 7.00E−03 | 2.66E−01 | 2.66E−01 | 7.32E−01 | 5.44E−01 | 5.49E−01 |
| 360 | 7.00E−03 | 2.40E−01 | 2.44E−01 | 6.87E−01 | 5.26E−01 | 5.26E−01 |
| 340 | 8.00E−03 | 2.14E−01 | 2.32E−01 | 6.81E−01 | 4.99E−01 | 5.38E−01 |
| 320 | 7.00E−03 | 1.66E−01 | 1.95E−01 | 6.70E−01 | 4.45E−01 | 5.11E−01 |
| 300 | 0.005−00 | 1.49E−01 | 1.74E−01 | 6.40E−01 | 4.253−01 | 5.00E−01 |
| 280 | 0.00E−00 | 7.60E−02 | 9.60E−02 | 4.94E−01 | 2.72E−01 | 3.90E−01 |

TABLE 9

TRANSMITTANCE
4000–6250 nm - Measured as for System Four

| | Sample | | |
|---|---|---|---|
| Wavelength nm | SS | T534 | EU |
| 4000 | 1.40E−04 | 2.97E−02 | 3.57E−02 |
| 4166 | 1.00E−04 | 4.05E−02 | 4.82E−02 |
| 4347 | 1.40E−04 | 4.86E−02 | 5.71E−02 |
| 4545 | 2.10E−04 | 5.67E−02 | 6.78E−02 |
| 4761 | 7.00E−05 | 7.02E−02 | 8.21E−02 |
| 5000 | 1.40E−04 | 8.64E−02 | 1.03E−01 |
| 5263 | 1.00E−04 | 9.18E−02 | 1.17E−01 |
| 5555 | 1.00E−04 | 9.72E−02 | 1.07E−01 |
| 5882 | 7.00E−05 | 8.91E−02 | 1.14E−01 |
| 6250 | 1.00E−04 | 6.48E−02 | 8.57E−02 |

Aspects of the invention have been described by way of example only and it should be appreciated that modifications and additions thereto may be made without departing from the scope of the invention.

What is claimed is:

1. A reflective plant treatment material which reflects more solar radiation than it either transmits or absorbs in the UV (about 280–400 nm), visible (about 400–700 nm) and near infrared (about 700–800 nm) ranges; and which transmits at least part of radiation in the range about 800–2500 nm and at least part of radiation above about 2500 nm.

2. A reflective plant treatment material according claim 1, wherein the material reflects more radiation than it transmits and absorbs in the UV, visible, and near infrared ranges.

3. A reflective plant treatment material according to claim 1, wherein said material transmits at least 5% of radiation in the range about 800–2500 nm.

4. A reflective plant treatment material according to claim 1, wherein said material transmits at least 5% of radiation in the range about 2500–20000 nm.

5. A ground cover which reflects more solar radiation than it either transmits or absorbs in the UV (about 280–400 nm), visible (about 400–700 nm) and near infrared (about 700–800 nm) ranges, and which transmits at least part of radiation in the range about 800–2500 nm and at least part of radiation above about 2500 nm.

6. A ground cover according to claim 5, wherein the reflectance and transmittance of the ground cover is shown in the table below:

| Wavelength nm | Reflectance | Transmittance |
| --- | --- | --- |
| 280–300 | 23–86% | 0–77% |
| 301–360 | 23–90% | 0–77% |
| 361–380 | 23–90% | 0–77% |
| 381–420 | 29–90% | 0–71% |
| 421–700 | 37–90% | 0–63% |
| 701–1000 | 29–89% | 0–71% |
| 1001–1640 | 30–90% | 9–70% |
| 1641–2200 | 18–93% | 7–82% |
| 2201–2500 | 10–96% | 4–90% |
| 4100–6100 |  | 1–95% |
| 8100–10100 |  | 1–95% | said reflectance and transmittance values being measured for the 280–2500 nm range using a high accuracy spectrophotometer system based around a 1 m focal length Czesny Turner monochromator, and said reflectance and transmittance values for the above 2500 nm range being measured using a BOMEN DA8 Fourier Transform Infrared spectrophotometer in the 2.5 to 22 mm region.

7. A ground cover according to claim 5, wherein the reflectance and transmittance of the ground cover is shown in the table below:

| Wavelength nm | Reflectance | Transmittance |
| --- | --- | --- |
| 280–300 | 27–86% | 0–75% |
| 301–360 | 33–90% | 2–67% |
| 361–380 | 37–90% | 5–63% |
| 381–420 | 43–90% | 6–57% |
| 421–700 | 44–90% | 9–58% |
| 701–1000 | 40–89% | 11–60% |
| 1001–1640 | 35–90% | 12–65% |
| 1641–2200 | 24–93% | 7–76% |
| 2201–2500 | 15–96% | 1–85% |
| 4100–6100 |  | 1–95% |
| 8100–10100 |  | 1–95% | said reflectance and transmittance values being measured for the 280–2500 nm range using a high accuracy spectrophotometer system based around a 1 m focal length Czesny Turner monochromator, and said reflectance and transmittance values for the above 2500 nm range being measured using a BOMEN DA8 Fourier Transform Infrared spectrophotometer in the 2.5 to 22 mm region.

8. A ground cover according to claim 5, wherein the reflectance and transmittance of the ground cover is shown in the table below:

| Wavelength nm | Reflectance | Transmittance |
| --- | --- | --- |
| 280–300 | 37–86% | 0–63% |
| 301–360 | 41–90% | 2–59% |
| 361–380 | 51–90% | 5–49% |
| 381–420 | 51–90% | 6–49% |
| 421–700 | 54–90% | 9–46% |
| 701–1000 | 47–89% | 11–53% |
| 1001–1640 | 42–90% | 10–58% |
| 1641–2200 | 24–93% | 7–76% |
| 2201–2500 | 17–96% | 1–83% |
| 4100–6100 |  | 1–95% |
| 8100–10100 |  | 1–95% | said reflectance and transmittance values being measured for the 280–2500 nm range using a high accuracy spectrophotometer system based around a 1 m focal length Czesny Turner monochromator, and said reflectance and transmittance values for the above 2500 nm range being measured using a BOMEN DA8 Fourier Transform Infrared spectrophotometer in the 2.5 to 22 mm region.

9. A ground cover according to claim 6, comprising a white pigment chosen from zirconium, strontium, barium, magnesium and calcium pigments.

10. A ground cover according to claim 9, wherein the white pigment is present in an amount of 5–50% by weight.

11. A ground cover according to claim 9, wherein said pigment is selected from the group consisting of zirconium dioxide, magnesium zirconate, calcium zirconate, strontium zirconate, barium zirconate, zirconium silicate, calcium carbonate, barium sulphate, magnesium oxide, strontium carbonate and barium carbonate.

12. A ground cover according to claim 11, wherein said white pigment is selected from the group consisting of zirconium dioxide, barium sulphate and calcium carbonate.

13. A ground cover according to claim 11, wherein said white pigment is calcium carbonate.

14. A ground cover according to claim 6, comprising at least one metallic pigment selected from the group consisting of aluminum, magnesium, nickel, silver, tin and zinc.

15. A ground cover according to claim 14, wherein the metallic pigment is present in an amount of 0.5–6% by weight.

16. A ground cover according to claim 14, wherein said metallic pigment is aluminum.

17. A ground cover according to claim 14, wherein said pigment(s) is/are present in a plastics material.

18. A ground cover according to claim 17, wherein said white pigment is calcium carbonate and the polymer-pigment mixture is mono-oriented.

19. A ground cover according to claim 17, wherein said white pigment is calcium carbonate and the polymer-pigment mixture is biaxially-oriented.

20. A ground cover according to claim 18, wherein said calcium carbonate is in the form of particles of size 0.5–3 microns.

21. A ground cover according to claim 18, wherein the ground cover comprises a polyolefin.

22. A ground cover according to claim 17, wherein the ground cover is a woven material.

23. A ground cover according to claim 17, which comprises a film.

24. A ground cover according to claim 22, wherein said woven material is woven from tapes comprising calcium carbonate and separate tapes comprising aluminum platelets.

25. A ground cover according to claim 23, wherein the ground cover has a partial coating of metallized aluminum.

26. A ground cover according to claim 16, wherein said aluminum is contained in a plastic material.

27. A ground cover according to claim 26, wherein the ground cover comprises aluminum platelets.

28. A ground cover according to claim 27, wherein said aluminum is in the form of platelets of size 10–500 microns.

29. A ground cover according to claim 28, wherein said aluminum platelets are incorporated into a polymer-pigment mixture and mono-orientated or biaxially-orientated.

30. A ground cover according to claim 28, wherein the ground cover is a woven material woven from tapes containing the aluminum platelets and separate white tape containing calcium carbonate.

31. A ground cover according to claim 5, wherein the ground cover is formed from a plastic layer partially coated with metallized aluminum.

32. A ground cover according to claim 31, wherein the plastic layer is non-pigmented or is pigmented with calcium carbonate.

33. A method of treating plants comprising providing the plant with a reflective plant treatment material according to claim 1.

34. A method of treating plants according to claim 33, wherein the plants are fruit trees.

35. A ground cover according to claim 8, wherein titanium dioxide or another UV absorbing substance is present as a co-pigment in an amount that decreases the reflectance at 280–400 nm due to the main pigment.

36. A ground cover according to claim 5, wherein titanium dioxide is present as a pigment in a plastic sheet which has partial coverage of aluminum to an extent of 1–97%.

37. A reflective plant treatment material according to claim 1, wherein said material transmits at least 10% of radiation in the range about 800–2500 nm.

38. A reflective plant treatment material according to claim 1, wherein said material transmits at least 10% of radiation in the range about 2500–20000 nm.

39. A reflective plant treatment material according to claim 1, wherein said material transmits at least 15% of radiation in the range about 800–2500 nm.

40. A reflective plant treatment material according to claim 1, wherein said material transmits at least 15% of radiation in the range about 2500–20000 nm.

41. A reflective plant treatment material according to claim 3, wherein said material transmits at least 5% of radiation in the range about 2500–20000 nm.

42. A ground cover according to claim 19, wherein said calcium carbonate is in the form of particles of size 0.5–3 microns.

43. A ground cover according to claim 19, wherein the ground cover comprises a polyolefin.

44. A reflective plant treatment material according to claim 2, wherein said material transmits at least 10% of solar radiation in the range about 800–2500 nm.

45. A ground cover according to claim 5, wherein said around cover transmits at least 10 of radiation in the range of about 2500–20000 nm.

46. A reflective plant treatment material according to claim 2, wherein said material transmits at least 15% of solar radiation in the range about 800–2500 nm.

47. A ground cover according to claim 45, wherein said ground cover transmits at least 15% of radiation in the range of about 2500–20000 nm.

48. The combination comprising:
a plant growing in the ground, and
a ground cover adjacent the ground proximal to said growing plant, said around cover reflecting more solar radiation than it either transmits or absorbs in the UV (about 280–400 nm), visible (about 400–700 nm) and near infrared (about 700–800 nm) ranges and said ground cover transmiting at least part of radiation in the range about 800–2500 nm and at least part of radiation above about 2500 nm.

49. The combination according to claim 48, wherein the ground cover reflects more radiation than it transmits and absorbs in the UV, visible, and near infrared ranges.

50. The combination according to claim 48, wherein said ground cover transmits at least 5% of radiation in the range about 800–2500 nm.

51. The combination according to claim 48, where in said ground cover transmits at least 5% of radiation in the range about 2500–20000 nm.

52. The combination according to claim 48, wherein the reflectance and transmittance of the ground cover is shown in the table below:

| Wavelength nm | Reflectance | Transmittance |
| --- | --- | --- |
| 280–300 | 23–86% | 0–77% |
| 301–360 | 23–90% | 0–77% |
| 361–380 | 23–90% | 0–77% |
| 381–420 | 29–90% | 0–71% |
| 421–700 | 37–90% | 0–63% |
| 701–1000 | 29–89% | 0–71% |
| 1001–1640 | 30–90% | 9–70% |
| 1641–2200 | 18–93% | 7–82% |
| 2201–2500 | 10–96% | 4–90% |
| 4100–6100 | | 1–95% |
| 8100–10100 | | 1–95% | said reflectance and transmittance values being measured for the 280–2500 nm range using a high accuracy spectrophotometer system based around a 1 m focal length Czesny Turner monochromator, and said reflectance and transmittance values for the above 2500 nm range being measured using a BOMEN DA8 Fourier Transform Infrared spectrophotometer in the 2.5 to 22 mm region.

53. The combination according to claim 48, wherein the reflectance and transmittance of the ground cover is shown in the table below:

| Wavelength nm | Reflectance | Transmittance |
| --- | --- | --- |
| 280–300 | 27–86% | 0–75% |
| 301–360 | 33–90% | 2–67% |
| 361–380 | 37–90% | 5–63% |
| 381–420 | 43–90% | 6–57% |
| 421–700 | 44–90% | 9–58% |
| 701–1000 | 40–89% | 11–60% |
| 1001–1640 | 35–90% | 12–65% |
| 1641–2200 | 24–93% | 7–76% |
| 2201–2500 | 15–96% | 1–85% |
| 4100–6100 | | 1–95% |
| 8100–10100 | | 1–95% | said reflectance and transmittance values being measured for the 280–2500 nm range using a high accuracy spectrophotometer system based around a 1 m focal length Czesny Turner monochromator, and said reflectance and transmittance values for the above 2500 nm range being measured using a BOMEN DA8 Fourier Transform Infrared spectrophotometer in the 2.5 to 22 mm region.

54. The combination according to claim 48, wherein the reflectance and transmittance of the ground cover is shown in the table below:

| Wavelength nm | Reflectance | Transmittance |
| --- | --- | --- |
| 280–300 | 37–86% | 0–63% |
| 301–360 | 41–90% | 2–59% |
| 361–380 | 51–90% | 5–49% |
| 381–420 | 51–90% | 6–49% |
| 421–700 | 54–90% | 9–46% |
| 701–1000 | 47–89% | 11–53% |
| 1001–1640 | 42–90% | 10–58% |
| 1641–2200 | 24–93% | 7–76% |
| 2201–2500 | 17–96% | 1–83% |
| 4100–6100 | | 1–95% |
| 8100–10100 | | 1–95% | said reflectance and transmittance values being measured for the 280–2500 nm range using a high accuracy spectrophotometer system based around a 1 m focal length Czesny Turner monochromator, and said reflectance and transmittance values for the above 2500 nm range being measured using a BOMEN DA8 Fourier Transform Infrared spectrophotometer in the 2.5 to 22 mm region.

55. The combination according to claim 52, comprising a white pigment chosen from zirconium, strontium, barium, magnesium and calcium pigments.

56. The combination according to claim 55, wherein the white pigment is present in an amount of 5–50% by weight.

57. The combination according to claim 55, wherein said pigment is selected from the group consisting of zirconium dioxide, magnesium zirconate, calcium zirconate, strontium zirconate, barium zirconate, zirconium silicate, calcium carbonate, barium sulphate, magnesium oxide, strontium carbonate and barium carbonate.

58. The combination according to claim 57, wherein said white pigment is selected from the group consisting of zirconium dioxide, barium sulphate and calcium carbonate.

59. The combination according to claim 57, wherein said white pigment is calcium carbonate.

60. The combination according to claim 52, comprising at least one metallic pigment selected from the group consisting of aluminum, magnesium, nickel, silver, tin and zinc.

61. The combination according to claim 60, wherein the metallic pigment is present in an amount of 0.5–6% by weight.

62. The combination according to claim 60, wherein said metallic pigment is aluminuim.

63. The combination according to claim 60, wherein said pigment(s) is/are in a plastics material.

64. The combination according to claim 63, wherein said white pigment is calcium carbonate and the polymer-pigment mixture is mono-oriented.

65. The combination according to claim 63, wherein said white pigment is calcium carbonate and the polymer-pigment mixture is biaxially-oriented.

66. The combination according to claim 64, wherein said calcium carbonate is in the form of particles of size 0.5–3 microns.

67. The combination according to claim 64, wherein the ground cover comprises a polyolefin.

68. The combination according to claim 63, wherein the ground cover is a woven material.

69. The combination according to claim 63, wherein the ground cover comprises a film.

70. The combination according to claim 68, wherein said woven material is woven from tapes comprising calcium carbonate and separate tapes comprising aluminium platelets.

71. The combination according to claim 69, wherein the ground cover has a partial coating of metallized aluminum.

72. The combination according to claim 62, wherein said aluminum is contained in plastic material.

73. The combination according to claim 72, wherein the ground cover comprises aluminum platelets.

74. The combination according to claim 73, wherein said aluminium is in the form of platelets of size 10–500 microns.

75. The combination according to claim 74, wherein said aluminium platelets are incorporated into a polymer-pigment mixture and mono-oriented or biaxially-oriented.

76. The combination according to claim 74, wherein the ground cover is a woven material woven from tapes containing aluminum platelets and separate white tape containing calcium carbonate.

77. The combination according to claim 48, wherein the ground cover is formed from a plastic layer partially coated with metallized aluminum.

78. The combination according to claim 77, wherein the plastic layer is non-pigmented or is pigmented with calcium carbonate.

79. The combination according to claim 54, wherein titanium dioxide or another UV absorbing substance is present as a co-pigment in an amount that deceases the reflectance at 280–400 nm due to the main pigment.

80. The combination according to claim 48, wherein titanium dioxide is present as a pigment in a plastic sheet which has partial coverage of aluminum to an extent of 1–97%.

81. The combination according to claim 48, wherein said ground cover transmits at least 10% of radiation in the range about 800–2500 nm.

82. The combination according to claim 48, wherein said ground cover transmits at least 10% of radiation in the range about 2500–20000 nn.

83. The combination according to claim 48, wherein said ground cover transmits at least 15% of radiation in the range about 800–2500 nm.

84. The combination according to claim 48, wherein said ground cover transmits at least 15% of radiation in the range about 2500–20000 nm.

85. The combination according to claim 65, wherein said calcium carbonate is in the form of particles of size 0.5–3 microns.

86. The combination according to claim 65, wherein the ground cover comprises a polyolefin.

* * * * *